(12) United States Patent
Shitomi et al.

(10) Patent No.: US 8,347,028 B2
(45) Date of Patent: Jan. 1, 2013

(54) PERFORMANCE SEPARATION OPTIMIZATION ACCORDING TO PROTOCOL USAGE STATUS AND STORAGE SYSTEM PERFORMANCE

(75) Inventors: Hidehisa Shitomi, Yokohama (JP);
Takuya Okamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 732 days.

(21) Appl. No.: 12/526,664

(22) PCT Filed: Jun. 26, 2009

(86) PCT No.: PCT/JP2009/002947
§ 371 (c)(1),
(2), (4) Date: Aug. 11, 2009

(87) PCT Pub. No.: WO2010/150321
PCT Pub. Date: Dec. 29, 2010

(65) Prior Publication Data
US 2011/0138136 A1    Jun. 9, 2011

(51) Int. Cl.
*G06F 12/00* (2006.01)
(52) U.S. Cl. ............... 711/111; 711/154; 711/E12.001
(58) Field of Classification Search .................. None
See application file for complete search history.

(56) References Cited

U.S. PATENT DOCUMENTS

| | | |
|---|---|---|
| 2005/0149677 A1 | 7/2005 | Shimada et al. |
| 2006/0224854 A1 | 10/2006 | Nakamura |
| 2006/0248047 A1 | 11/2006 | Grier et al. |
| 2008/0250219 A1 | 10/2008 | Shimada |

FOREIGN PATENT DOCUMENTS

| | | |
|---|---|---|
| JP | 2005-71103 A | 3/2005 |
| JP | 2006-285808 A | 10/2006 |
| JP | 2008-257572 A | 10/2008 |
| WO | 2008/137047 A2 | 11/2008 |

*Primary Examiner* — Kevin Verbrugge
(74) *Attorney, Agent, or Firm* — Mattingly & Malur, PC

(57) ABSTRACT

For the purpose of optimizing the performance separation according to the usage status of the protocol and the storage system performance, in a storage system 1 including multiple storage devices 2400 which includes a storage controlling unit 2410 performing data write to or data read from a storage drive 2200 according to data input/output requests from an external device 1000 and a protocol processing unit 2514 that responds to a processing result for the input/output requests to the external device 1000 and is capable of responding to data input/output requests transmitted from the external device 1000 following at least two or more protocols, in which each of the storage devices 2400 includes a cluster processing unit 2516 configuring clusters 2811 with the other storage devices 2400 for the external device 1000 and a cluster processing unit 2516, the cluster processing unit 2516 is set to configure cluster groups 2812 for each protocol.

14 Claims, 18 Drawing Sheets

CLUSTER MANAGEMENT TABLE 2517

| CLUSTER NAME | NODE |
|---|---|
| CLUSTER 1 | 10.1.1.1–10.1.1.10 |
| CLUSTER 2 | 10.1.1.11–10.1.1.20 |

[Fig. 8]
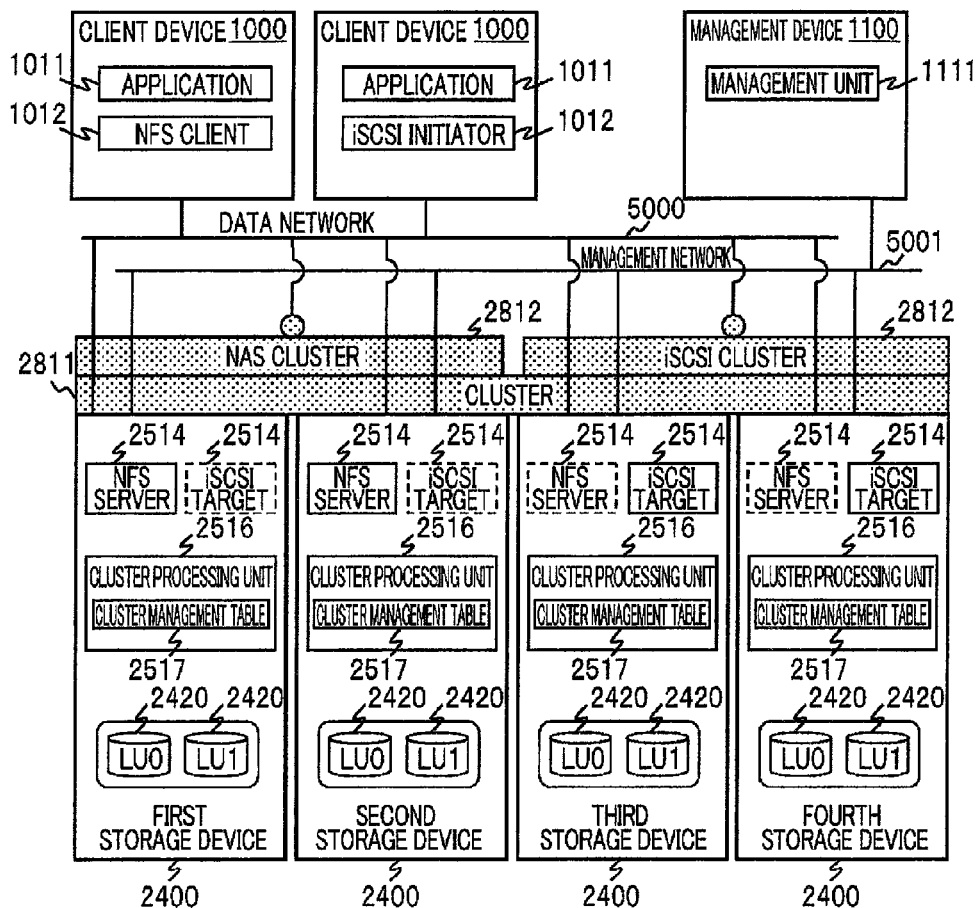
[Fig. 9]
CLUSTER MANAGEMENT TABLE 2517
| CLUSTER NAME | NODE | ROLE | NODE |
|---|---|---|---|
| CLUSTER 1 | 10.1.1.1-10.1.1.10 | NAS-1 | 10.1.1.1-10.1.1.5 |
| CLUSTER 1 | 10.1.1.1-10.1.1.10 | iSCSI-1 | 10.1.1.6-10.1.1.10 |
| CLUSTER 2 | 10.1.1.11-10.1.1.20 | FC-1 | 10.1.1.11-10.1.1.15 |
| CLUSTER 2 | 10.1.1.11-10.1.1.20 | NAS-2 | 10.1.1.16-10.1.1.20 |

[Fig. 10]
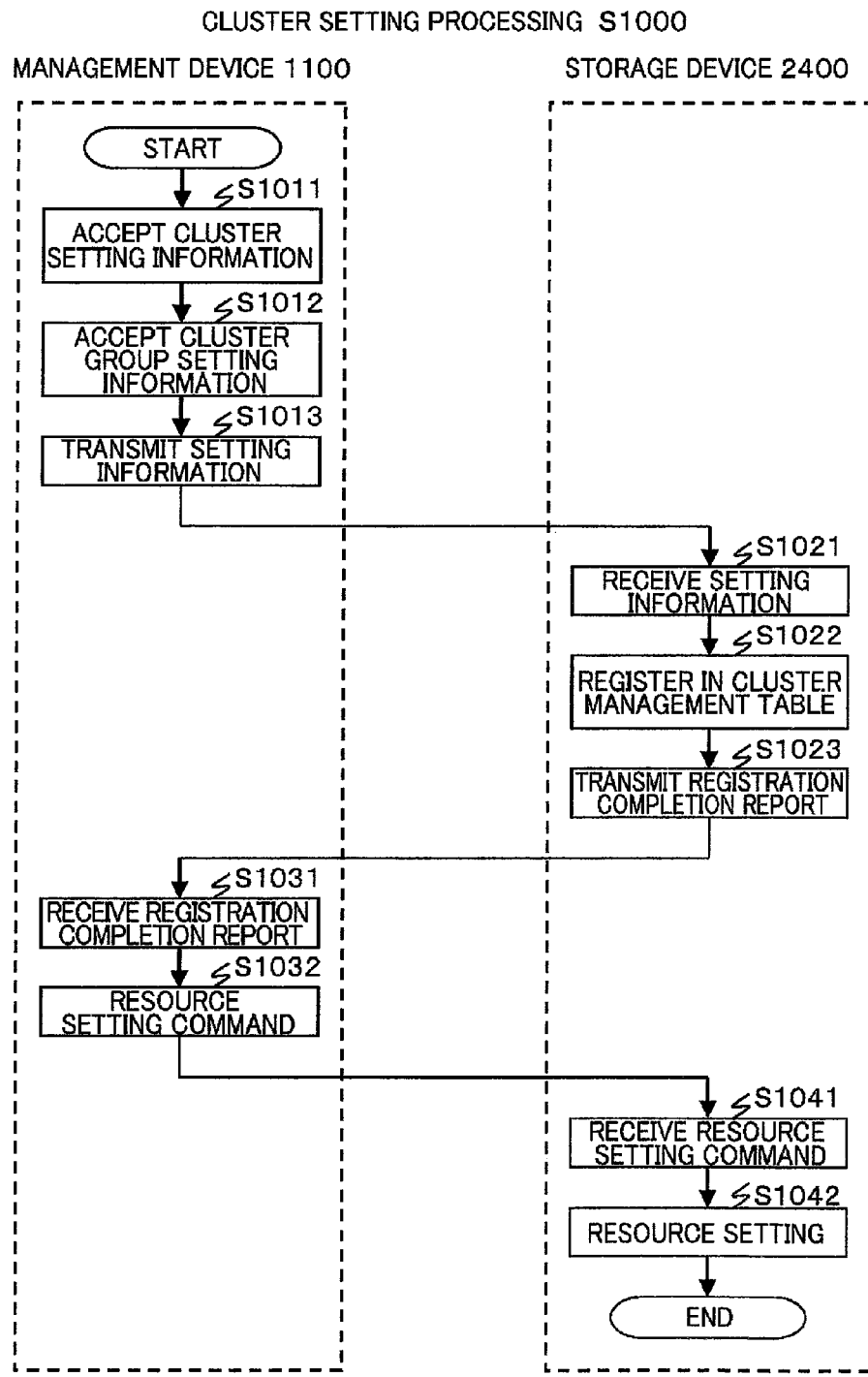

[Fig. 11]
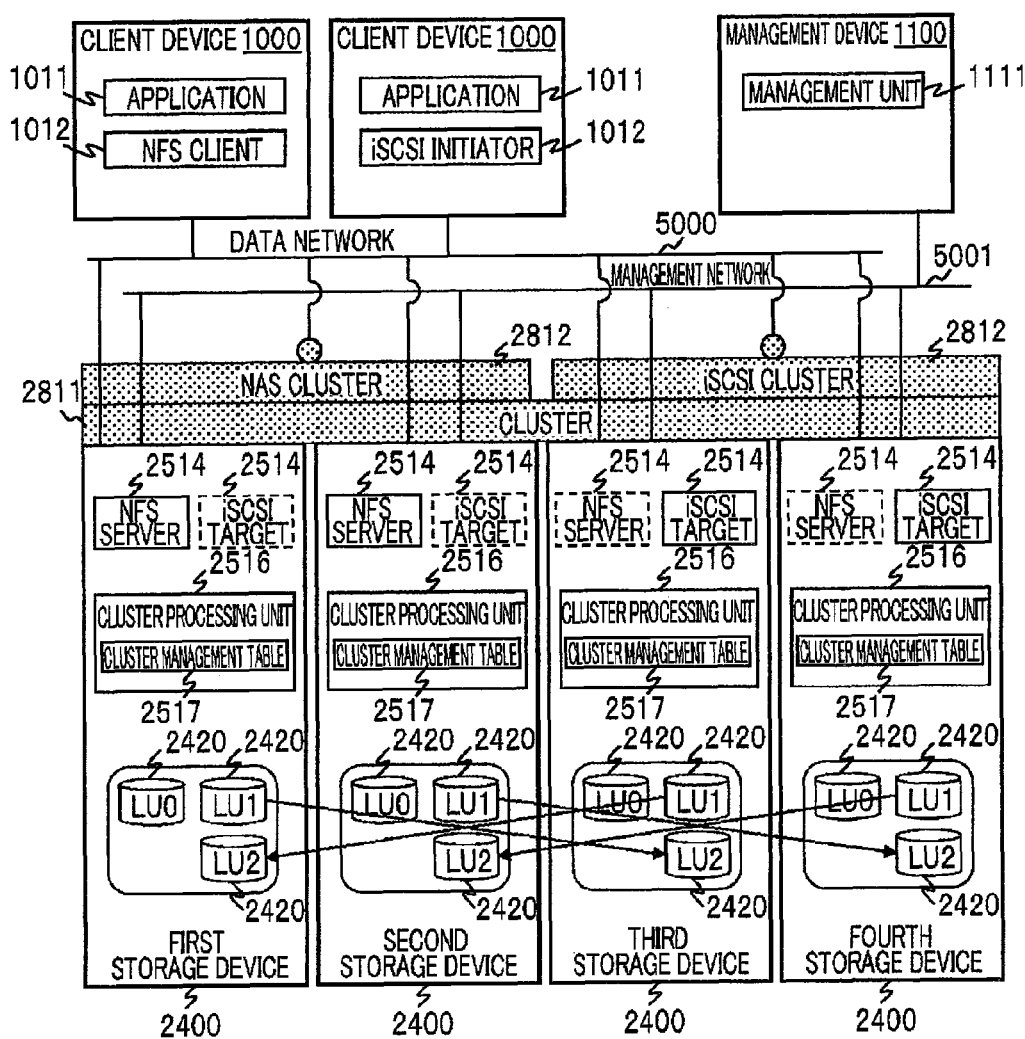

[Fig. 12]
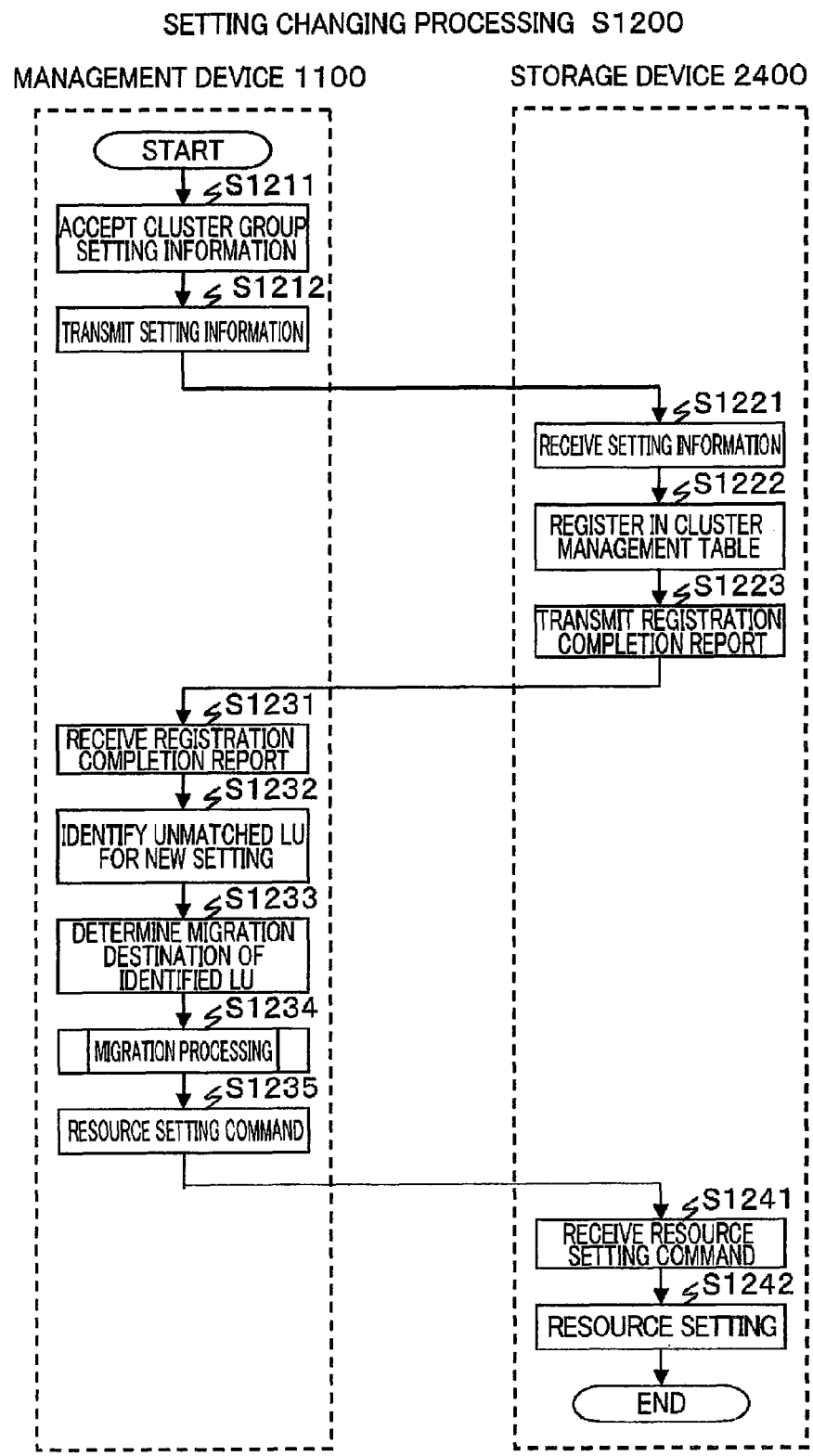

[Fig. 13]

VOLUME MANAGEMENT TABLE 1300

| LUN | USAGE |
|-----|-------|
| 000 | NAS |
| 001 | iSCSI |
| 002 | NAS |
| 003 | iSCSI |

1311, 1312

[Fig. 14]
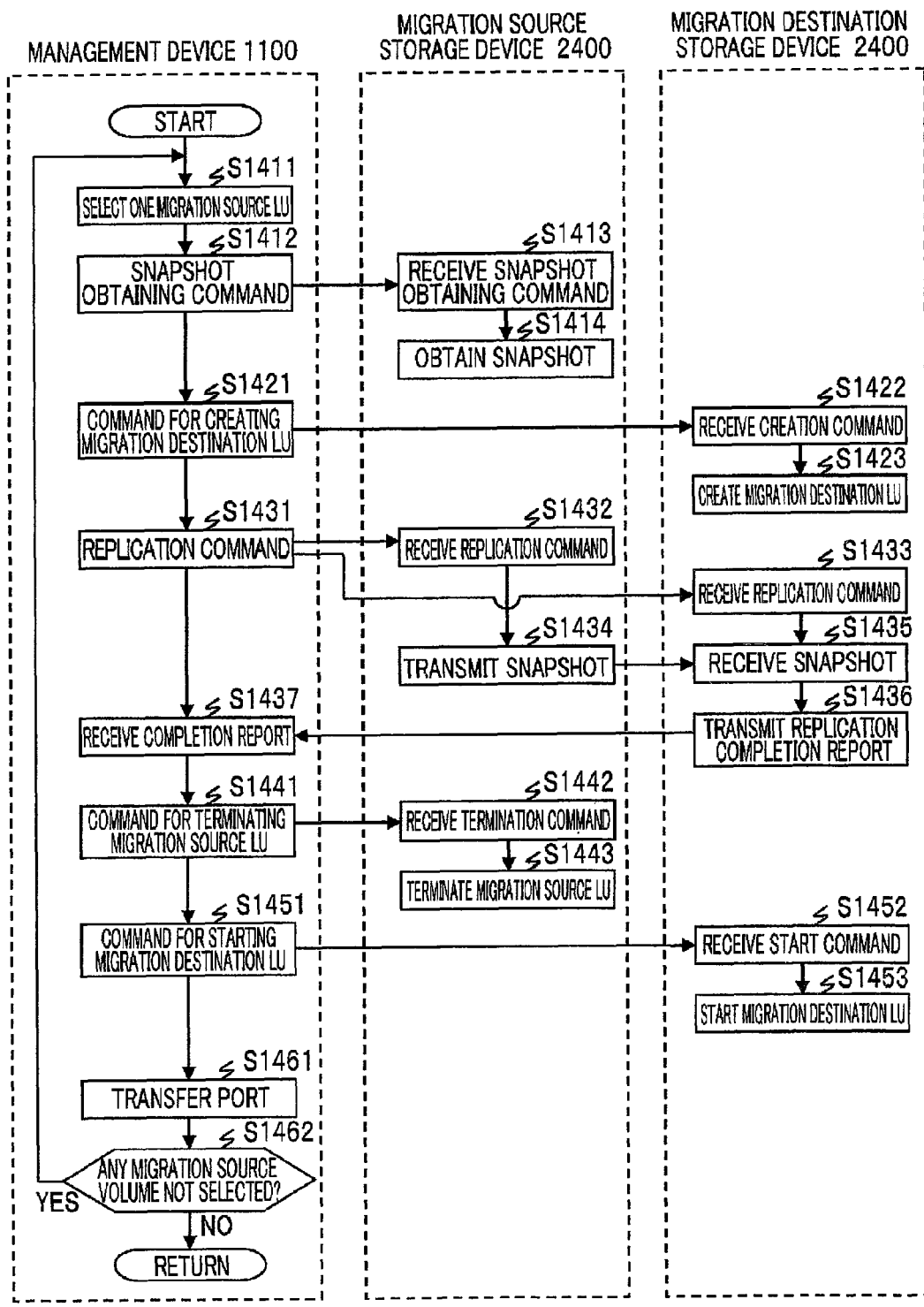

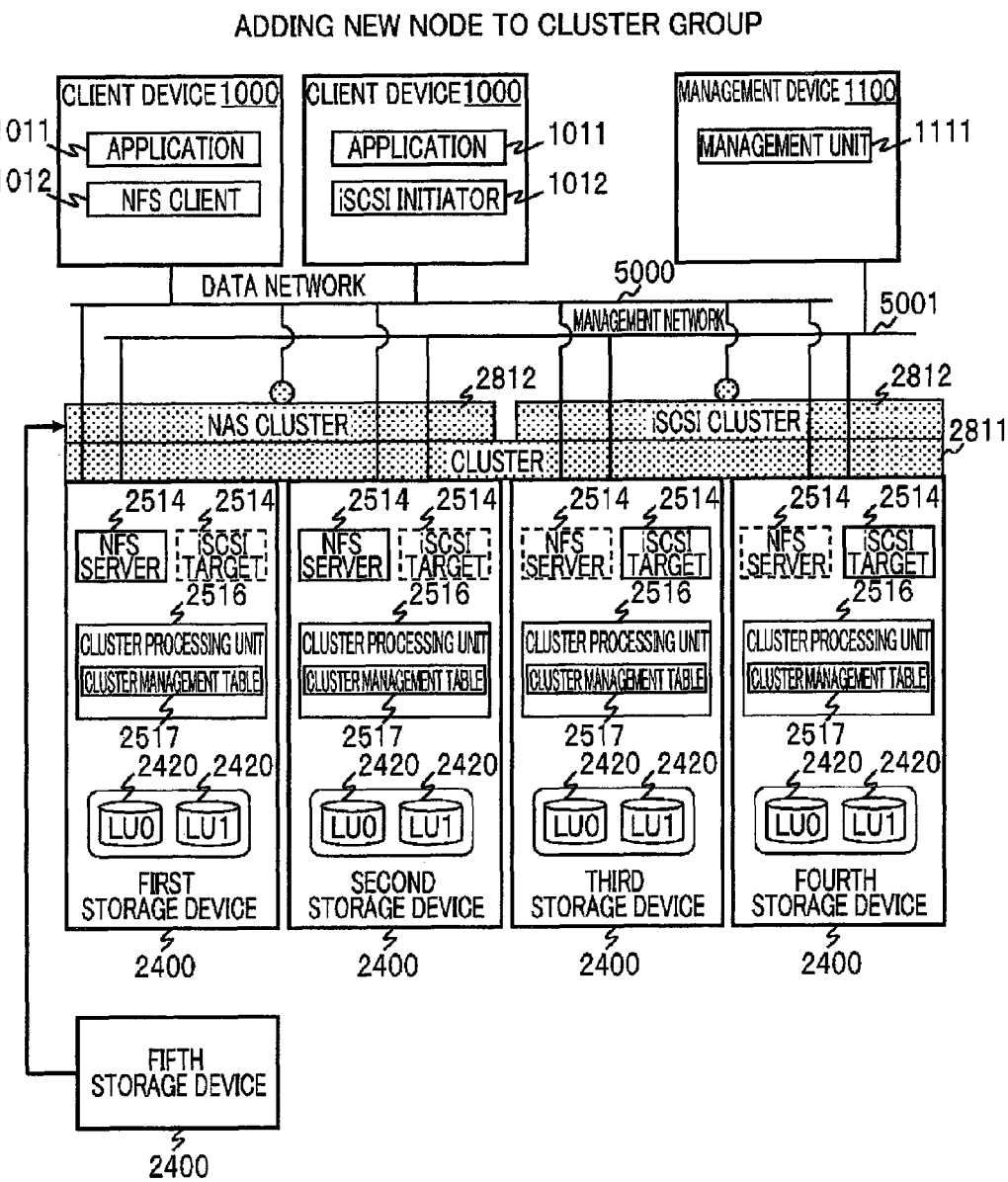
[Fig. 15]

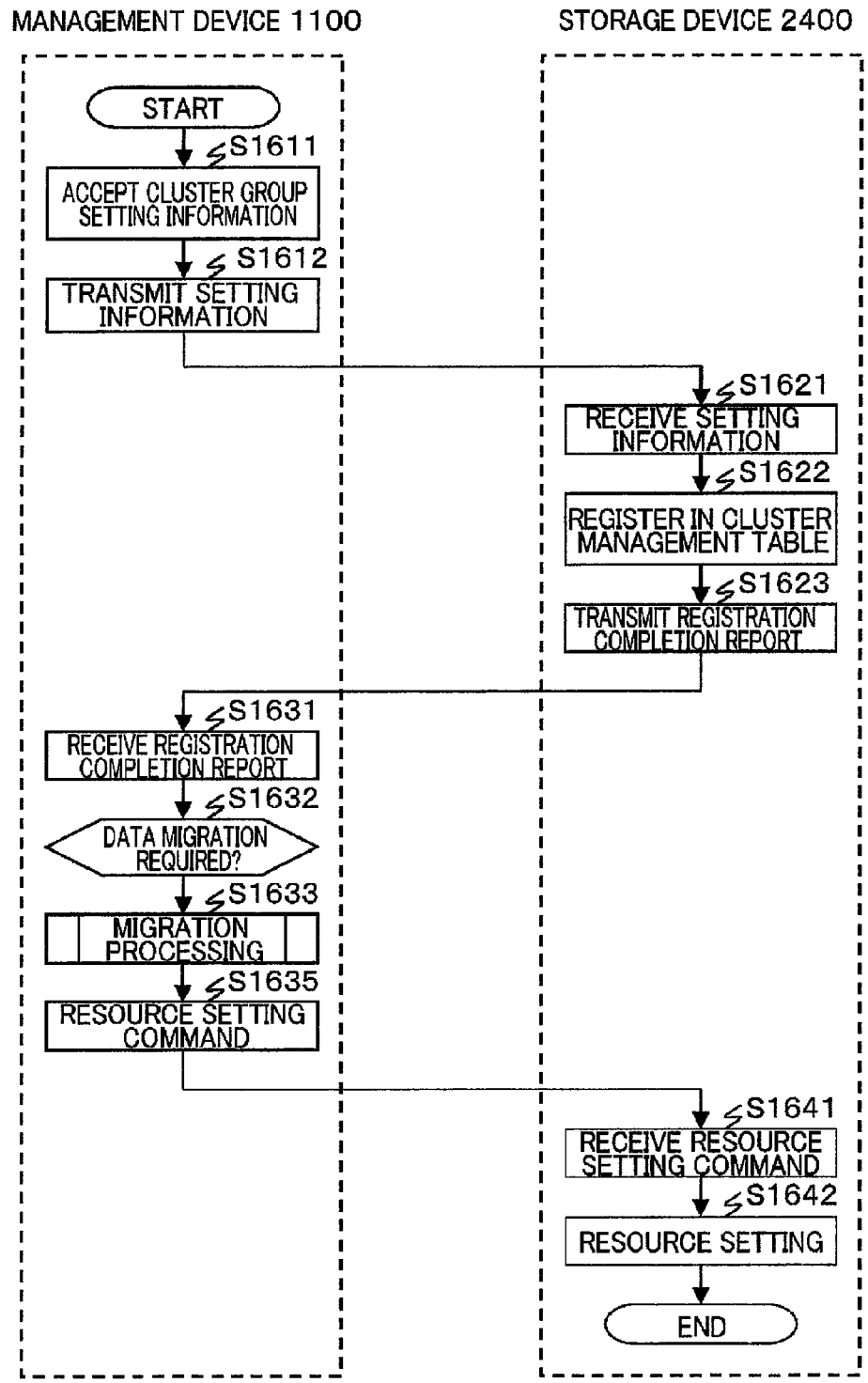

[Fig. 17]
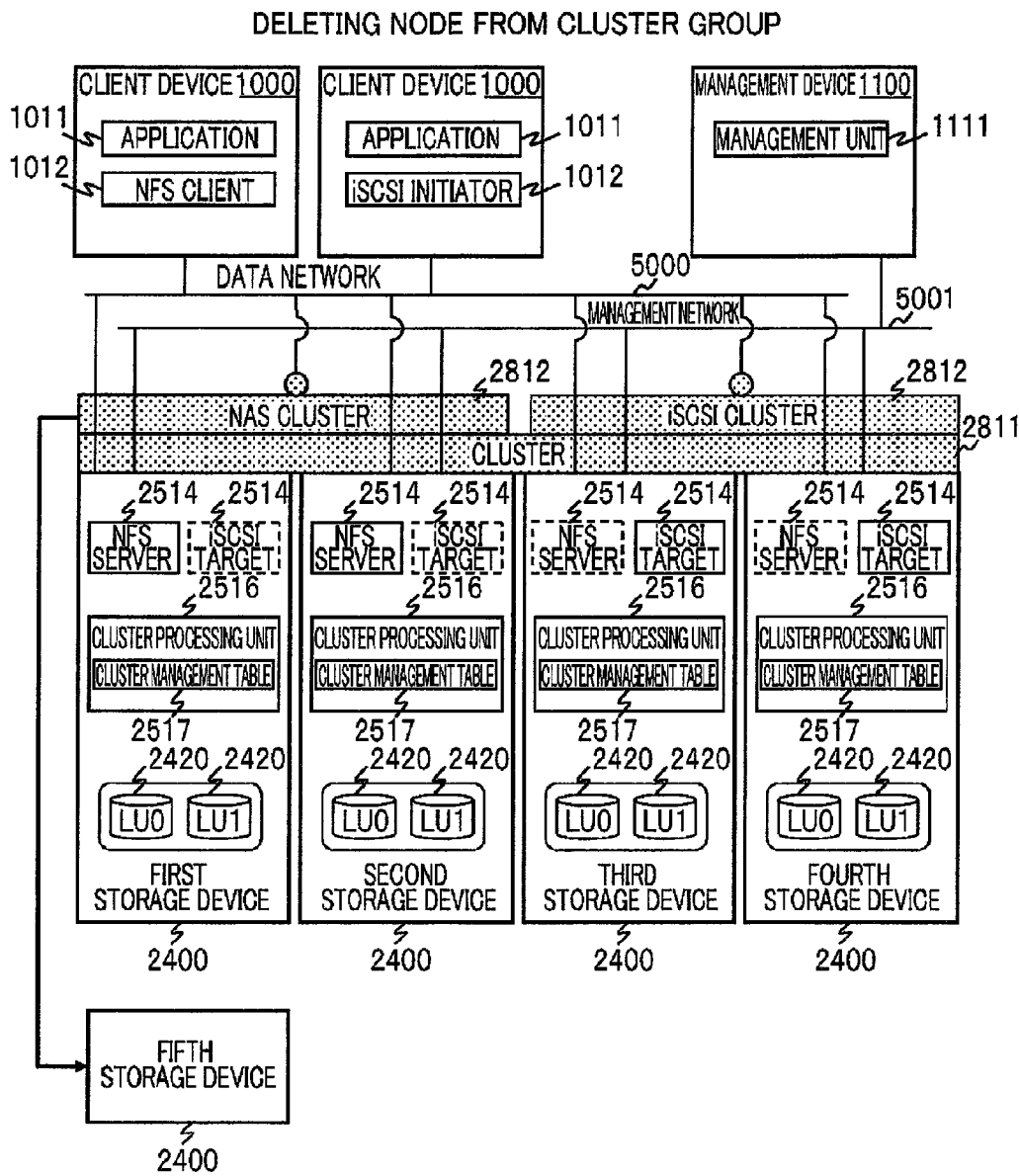

[Fig. 18]
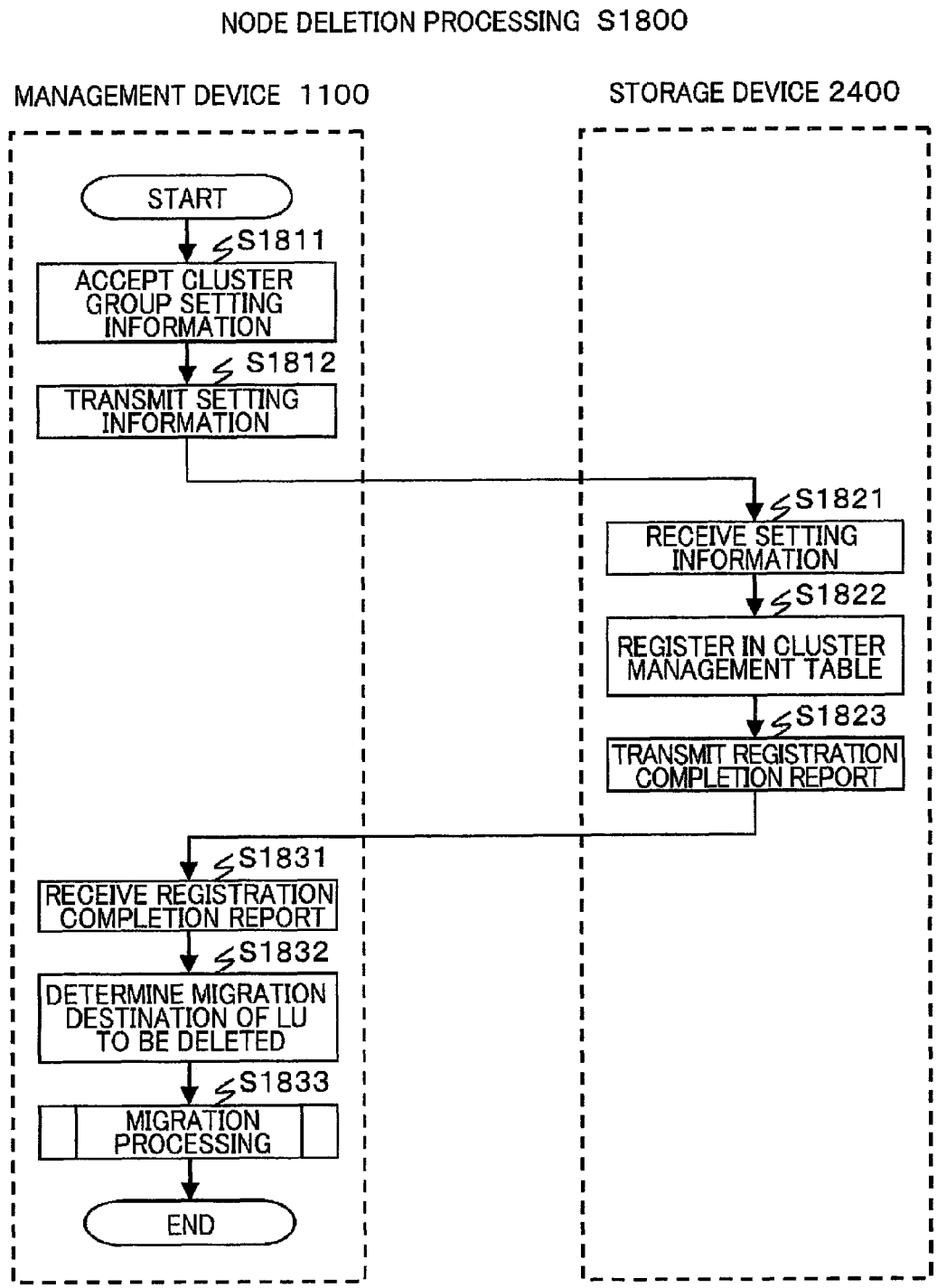

[Fig. 19]
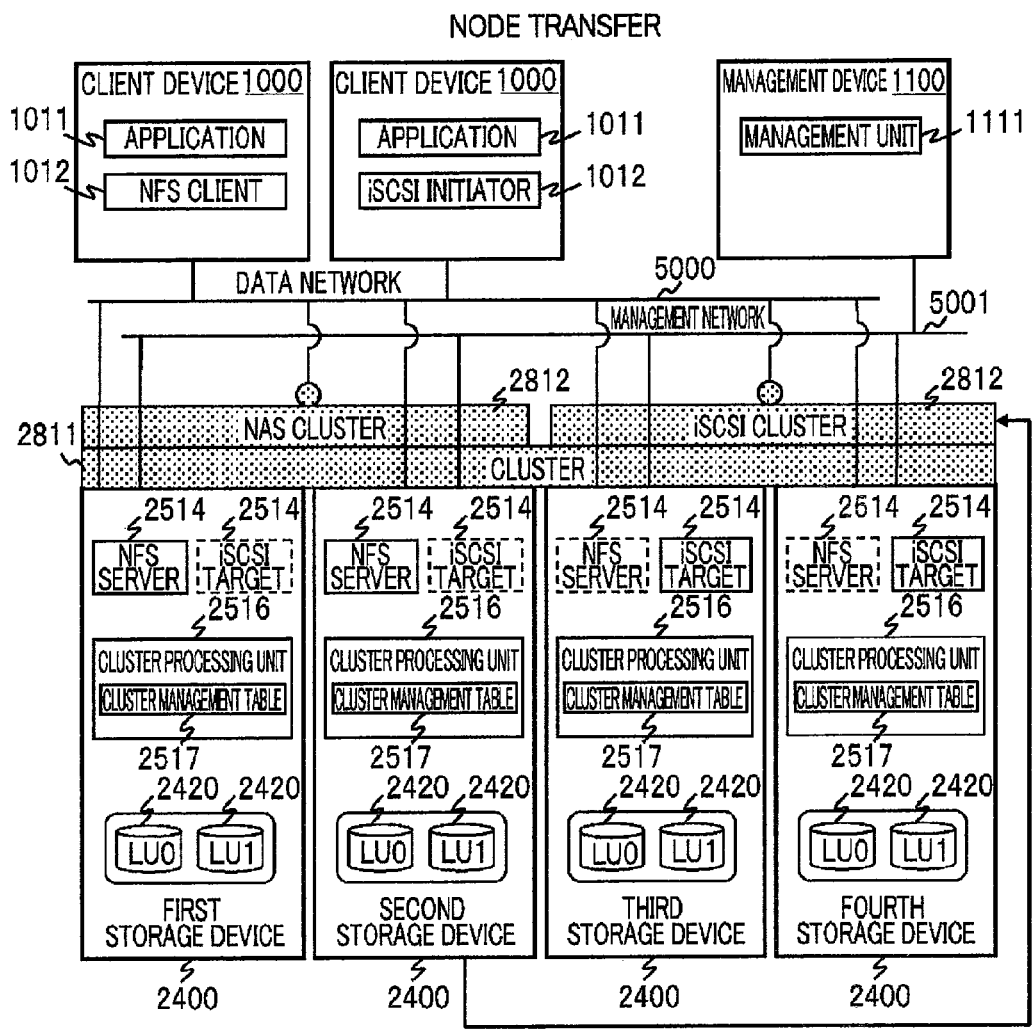

[Fig. 20]
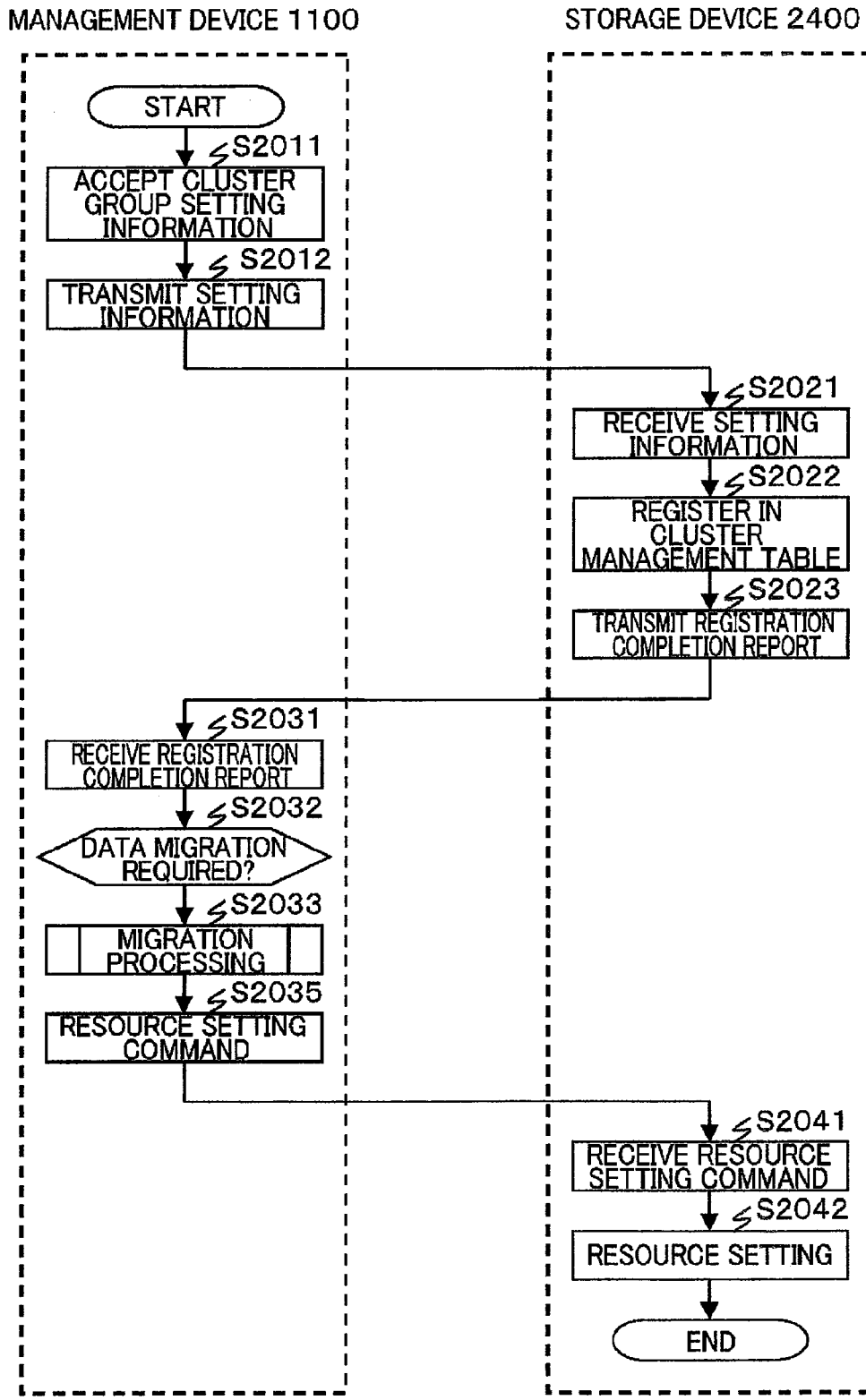

PERFORMANCE SEPARATION OPTIMIZATION ACCORDING TO PROTOCOL USAGE STATUS AND STORAGE SYSTEM PERFORMANCE

TECHNICAL FIELD

This invention relates to a storage system and control methods for the same, specifically to the technology of optimizing the performance separation according to the usage status of the protocol and the storage system performance.

BACKGROUND ART

For achieving the efficient operation of the storage system, there is a technology of configuring clusters by partitioning the storage system into multiple Logical Partitions (LPARs) and providing the clusters as multiple separate storage systems from the user.

For example, PTL (Patent Literature) 1 discloses that, in a cluster-type storage system in which multiple, relatively small-scale storage systems (clusters) are connected by the interconnection network and used as one system, for the purpose of solving the problem that the logical partitioning in the range of the limited bandwidth of the interconnection network cannot ensure the performance deserving the resources allocated to the Logical Partitions, the resources of the same cluster are allocated to each Logical Partition.

PTL 2 discloses that, for the purpose of efficiently utilizing the unused resources in the storage system, the control processor logically partitions the resources including the host I/F, the drive I/F, the disk drive, the data transfer engine, the cache memory and the control processor as the target of partitioning and configures multiple Logical Partitions, and dynamically changes the partitioning ratio for each Logical Partition depending on the number of accesses from the host computer.

PTL 3 discloses that, when managing Logical Partitions of the subsystem for which storage consolidation has been performed, for preventing the operational errors by the administrator or others when changing the RAID configuration, the function of changing the RAID configuration is allowed to be released in a specified range.

CITATION LIST

Patent Literature

[PTL 1]
Japanese Patent Application Laid-open Publication No. 2006-285808
[PTL 2]
Japanese Patent Application Laid-open Publication No. 2008-257572
[PTL 3]
Japanese Patent Application Laid-open Publication No. 2005-71103

SUMMARY OF INVENTION

Technical Problem

The demand is expected to increase for COS (Cloud Optimized Storage) for the cloud service which, for achieving the low TCO (Total Cost of Ownership), can be started on a small scale with a small initial investment, catch up with the rapid growth (by Scale Out, i.e., installing a new storage system while keeping the configuration of the existing storage system), and flexibly change the configuration.

Furthermore, storages capable of independently corresponding to multiple protocols (hereinafter referred to as Unified Storages) such as iSCSI (Internet Small Computer System Interface), NFS/CIFS (NFS: Network File System, CIFS: Common Internet File System), or FC (Fibre Channel) are starting to spread.

It is expected that, in the operation of the storage system for the cloud service using the Unified Storage of the Scale-Out configuration, for optimizing the performance, the demand for efficiently utilizing (partitioning) the resources included in the Unified Storage (such as the CPU and the cache memory) will be evident.

However, as the Unified Storage processes multiple protocols by common CPU and the cache memory is also shared by the multiple protocols, it is difficult to optimize the performance separation according to the usage status of each protocol and the storage system performance.

This invention is intended in view of the above-mentioned background for the purpose of providing the storage system and the controlling methods for the same which can optimize the performance separation according to the usage status of the protocol and the storage system performance.

Solution to Problem

An aspect of this invention for solving the above-mentioned and other problems is a storage system comprising multiple storage devices, the storage device including:

a storage controlling unit writing data to a storage and reading data from the storage according to data input/output requests transmitted from an external device; and a protocol processing unit responding to the processing result for the input/output requests to the external device and being capable of responding to the data input/output requests following at least two or more protocols transmitted from the external device; wherein each of the storage devices includes a cluster processing unit configuring a cluster along with the other storage devices for the external device, and the cluster processing unit can configure cluster groups for each of the protocols.

Thus, by configuring cluster groups for each protocol by using the storage system using the storage device (Unified Storage) including the protocol processing unit capable of responding to the data input/output requests following at least two or more protocols transmitted from the external device, it becomes possible to optimize the performance separation according to the usage status of the protocol as well as the entire storage system performance.

Another aspect of this invention is the above-mentioned storage system, wherein the storage device stores a cluster management table in which the protocols handled by the cluster groups to which the storage devices belong are managed, and the cluster processing unit configures a cluster group for each of the protocols by forwarding or redirecting the data input/output requests transmitted from the external device to the other storage devices according to the cluster management table.

This invention enables easy configuration of cluster groups for each of the protocols by the cluster management table in which the protocols handled by the cluster group to which the storage devices belong are managed and the forwarding or redirecting function is included in the cluster processing unit.

Another aspect of this invention is the above-mentioned storage system, wherein if cluster groups for each of the protocols are configured, the cluster processing unit inactivates resources for achieving the protocols other than the protocol handled by the cluster group to which the storage device belongs among the resources for processing the protocols in the storage device.

As it is not necessary to activate protocols other than the protocol handled by the cluster group to which the storage device belongs, by inactivating such resources, the processing load on the storage device is reduced and the storage device can be efficiently operated.

Another aspect of this invention is the above-mentioned storage system, wherein the storage device stores the cluster management table in which the protocols handled by the cluster group to which each of the storage devices belongs are managed, the storage device provides the storage area of the storage in units of logical volumes which are the logically set storage area to the external device, and if the contents of the cluster management table are changed when the cluster group for each of the protocols has already been configured and if the protocol to which the logical volumes correspond does not match the protocol which the storage device to which the relevant logical volume belongs is supposed to handle after the change, the cluster processing unit migrates the data of the logical volume to the logical volume of the storage device of the other storage device which is supposed to handle the protocol after the change with which the relevant logical volume corresponds.

Thus, if the contents of the cluster management table are changed, the cluster processing unit automatically migrates the data to the logical volume of the other storage device matching the protocol to which the logical volume corresponds. Therefore, for example, by changing the cluster management table from a management device, the configuration of the cluster groups can be changed easily and flexibly.

Another aspect of this invention is the above-mentioned storage system, wherein the storage device stores the cluster management table in which the protocols handled by the cluster group to which each of the storage devices belongs are managed, the storage device provides the storage area of the storage in units of logical volumes which are the logically set storage area to the external device, and if the contents of the cluster management table are changed to newly add a storage device to an already configured cluster group when the cluster groups for each of the protocols have already been configured, the cluster processing unit determines whether it is necessary to relocate the data or not according to load information of the logical volume, and if it is determined to be necessary, migrates the data between the logical volumes.

As mentioned above, if the contents of the cluster management table are changed to newly add the storage device to the already configured cluster group when the cluster groups for each of the protocols have already been configured, the cluster processing unit determines whether it is necessary to relocate the data or not according to the load information of the logical volume, and if it is determined to be necessary, migrates the data between the logical volumes. Thus, this invention enables easy addition of a new storage device to the already configured cluster group by changing the contents of the cluster management table. It is also possible to optimize the performance of the storage system by attempting load distribution at the time of relocation.

Another aspect of this invention is the above-mentioned storage system, wherein the storage device stores the cluster management table in which the protocols handled by the cluster group to which each of the storage devices belongs are managed, the storage device provides the storage area of the storage in units of logical volumes which are the logically set storage area to the external device, and if the contents of the cluster management table are changed to delete a storage device from an already configured cluster group when the cluster groups for each of the protocols have already been configured, the cluster processing unit migrates the data of the logical volume of the storage device to be deleted to the logical volume of another storage device handling the protocol which the relevant storage device used to handle.

As mentioned above, if the contents of the cluster management table are changed to delete the storage device from the already configured cluster group when the cluster groups for each of the protocols have already been configured, the cluster processing unit migrates the data to the logical volume of the other storage device handling the protocol which the relevant storage device used to handle. Thus, this invention enables easy deletion of a storage device from the already configured cluster group by changing the contents of the cluster management table.

Another aspect of this invention is the above-mentioned storage system, wherein the storage device stores the cluster management table in which the protocols handled by the cluster group to which each of the storage devices belongs are managed, the storage device provides the storage area of the storage in units of logical volumes which are the logically set storage area to the external device, and if the contents of the cluster management table are changed to migrate a storage device configuring a certain cluster group to another cluster group when the cluster groups for each of the protocols have already been configured, the cluster processing unit determines whether it is necessary to relocate the data or not according to the load information of the logical volume, and if it is determined to be necessary, migrates the data between the logical volumes.

As mentioned above, if the contents of the cluster management table are changed to migrate the storage device configuring a certain cluster group to the other cluster group when the cluster groups for each of the protocols have already been configured, the cluster processing unit determines whether it is necessary to relocate the data or not according to the load information of the logical volume, and if it is determined to be necessary, migrates the data between the logical volumes. Thus, this invention enables easy migration of a storage device configuring a certain cluster group to the other cluster group by changing the contents of the cluster management table. It is also possible to optimize the performance of the storage system by attempting load distribution at the time of relocation.

Note that the protocol is at least one of iSCSI (Internet Small Computer System Interface), NFS/CIFS (NFS: Network File System, CIFS: Common Internet File System), and FC (Fibre Channel).

The other problems and the means for solving for the same disclosed by this application are described in the embodiments and the attached figures.

Advantageous Effects of Invention

By this invention, the performance separation according to the usage status of the protocol and the storage system performance can be optimized.

BRIEF DESCRIPTION OF DRAWINGS

FIG. 8 is a diagram showing the case of setting cluster groups 2812 in units of protocols.

FIG. 9 is an example of the cluster management table 2517.

FIG. 10 is a flowchart showing the cluster group setting processing S1000.

FIG. 11 is a diagram showing the case of changing the settings of the cluster groups 2812.

FIG. 12 is a flowchart showing the setting changing processing S1200.

FIG. 13 is an example of the volume management table 1300.

FIG. 14 is a flowchart showing the migration processing 1234.

FIG. 15 is a diagram showing the case of adding a new node to a cluster group 2812.

FIG. 16 is a flowchart showing the node addition processing S1600.

FIG. 17 is a diagram showing the case of deleting a node from a cluster group 2812.

FIG. 18 is a flowchart showing the node deletion processing S1800.

FIG. 19 is a diagram showing the case of migrating a node between the cluster groups 2812.

FIG. 20 is a flowchart showing the node migration processing S2000.

DESCRIPTION OF EMBODIMENTS

Figure 1:
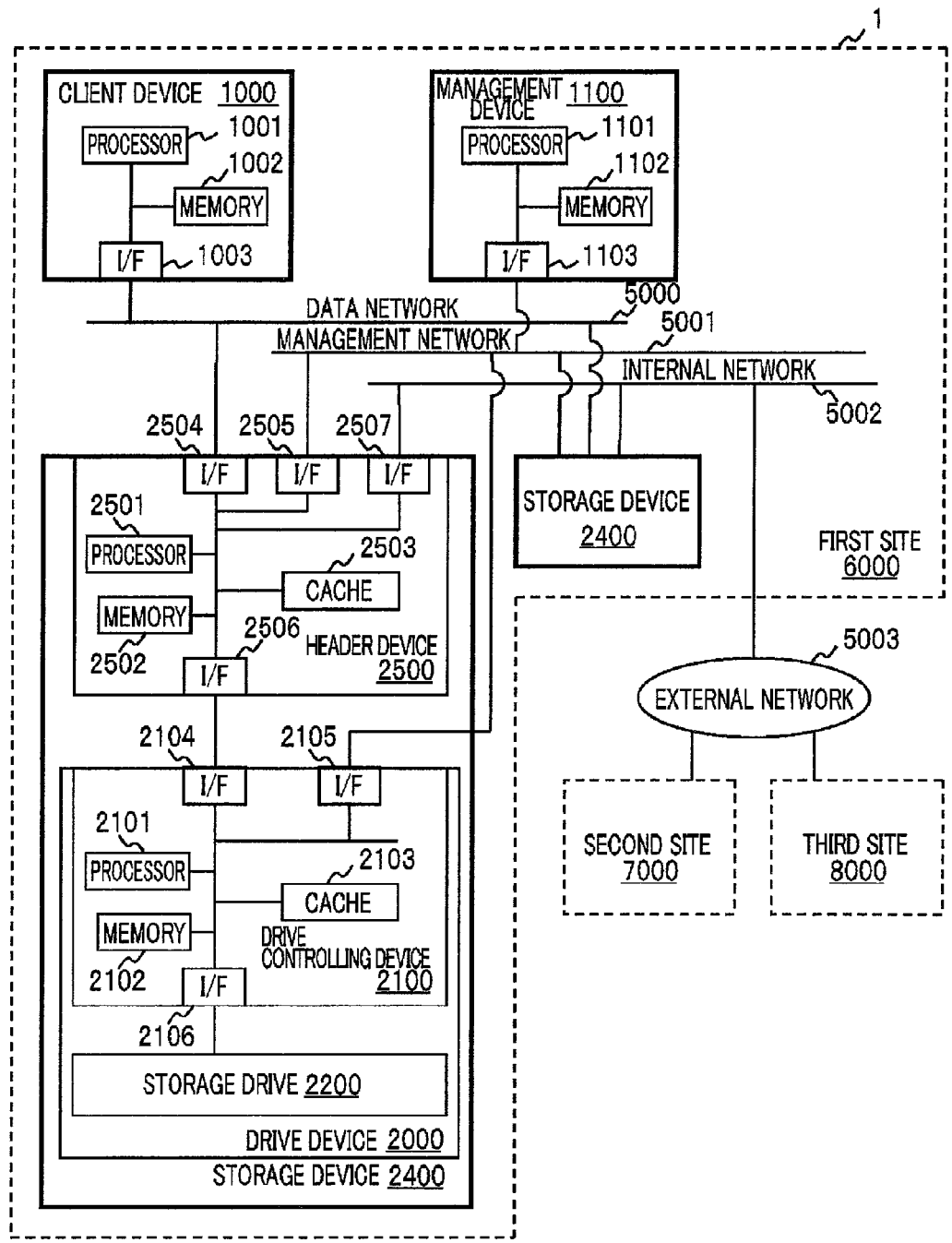
FIG. 1 is a schematic diagram of the configuration of the storage system 1.

The embodiments are described below. FIG. 1 shows the schematic view of the configuration of the storage system 1 described as an embodiment. As shown in FIG. 1, this storage system 1 includes multiple storage devices 2400, one or more client devices 1000 (external device), and a management device 1100 installed in the first site 6000 such as a data center, a system operation center or others.

The client device 1000 and the storage devices 2400 are connected as communicable via a data network 5000. The data network 5000 is, for example, LAN (Local Area Network), WAN (Wide Area Network), or SAN (Storage Area Network). The storage devices 2400 are connected as communicable with the management device 1100 via a management network 5001. The management network 5001 is, for example, LAN or WAN. The storage devices 2400 are connected as communicable with other storage systems installed in the other sites (the second site 7000 and the third site 8000) via an internal network 5002 and an external network 5003. The internal network 5002 is, for example, LAN, WAN, or SAN. The external network 5003 includes LAN, WAN, SAN, the Internet, a public telecommunication network and exclusive lines. Note that it is also possible to achieve the data network 5000, the management network 5001, the internal network 5002, and the external network 5003 by sharing the same physical communication media by a method of logically partitioning the communication bandwidth such as VLAN (Virtual LAN).

The client device 1000 is the device for accessing the storage devices 2400 and transmits data input/output requests (data write requests/data read requests) to the storage devices 2400. The client device 1000 transmits data input/output requests in units of blocks or files to the storage devices 2400.

The client device 1000 is an information processing device (computer) such as a personal computer, an office computer, mainframe or others. The client device 1000 includes at least a processor 1001 (e.g., a CPU (Central Processing Unit) or an MPU (Micro Processing Unit)), a memory 1002 (e.g., a volatile or non-volatile RAM (Random Access Memory) or a ROM (Read Only Memory)), and a communication interface 1003 (e.g., NIC (Network Interface Card) or an HBA (Host Bus Adaptor)). The client device 1000 may also include a storage (e.g., hard disk or a semiconductor storage device (SSD (Solid State Drive))), inputting devices such as a keyboard, a mouse and others, and outputting devices such as liquid crystal monitors and printers.

The communication between the client device 1000 and the storage devices 2400 is performed according to the protocols of, for example, TCP/IP, FICON (Fibre Connection, registered trademark), ESCON (Enterprise Systems Connection, registered trademark), ACONARC (Advanced Connection Architecture, registered trademark), FIBARC (Fibre Connection Architecture, registered trademark), and others.

The management device 1100 is an information processing device (computer) such as a personal computer, an office computer, or others. The management device 1100 includes at least a processor 1101 (e.g., a CPU or an MPU), a memory 1002 (e.g., a volatile or non-volatile RAM or a ROM), and a communication interface 1003 (e.g., NIC or an HBA).

The management device 1100 may also include a storage (e.g., a hard disk or a semiconductor storage device (SSD (Solid State Drive))), inputting devices such as a keyboard, a mouse and others, and outputting devices such as liquid crystal monitors and printers. The management device 1100 is connected as communicable with the storage devices 2400 via the management network 5001. The management device 1100 includes a user interface of GUI (Graphical User Interface), CLI (Command Line Interface), or others, and provides the functions for the user or the operator to control or monitor the storage devices 2400. It is also possible for the management device 1100 to be part of the storage devices 2400.

Each storage device 2400 includes a header device 2500, a drive controlling device 2100, and a storage drive 2200 (storage). Each of the header device 2500, the drive controlling device 2100, and the storage drive 2200 may be packed in a separate chassis, or at least some of these may be packed in the same chassis. The functions of the header device 2500 and the drive controlling device 2100 may also be achieved by common hardware.

The storage devices 2400 are Unified Storages corresponding to multiple protocols (such as iSCSI (Internet Small Computer System Interface), NFS/CIFS (NFS: Network File System, CIFS: Common Internet File System), FC (Fibre Channel), etc.) (i.e., capable of responding to the data input/output requests following multiple protocols).

The header device 2500 includes external communication interfaces 2504, 2505, 2507 (e.g., NIC and HBA) for the connection with the data network 5000, the management network 5001, and the internal network 5002, and an internal communication interface 2506 (e.g., NIC, HBA, PCI (Peripheral Component Interconnect), and PCI-Express (registered trademark)) for the communication with a processor 2501 (e.g., a CPU, an MPU, a DMA (Direct Memory Access), or a custom LSI (Large Scale Integration)), a memory 2502 (volatile or non-volatile RAM or ROM), a cache memory 2503 (volatile or non-volatile RAM), and the drive controlling device 2100.

The header device 2500 includes functions for performing the control related to the protocols (e.g., NAS (Network Attached Storage), iSCSI, NFS/CIFS, and FC) required for the communication with the client device 1000, functions related to file control (file system), and a function of caching data and data input/output requests exchanged with the client device 1000. The details of the functions included in the header device 2500 are described later.

The drive controlling device 2100 includes external communication interfaces 2104 and 2105 (e.g., NIC, HBA, PCI, and PCI-Express) for the connection with the header device 2500 and the management network 5001, a processor 2101 (e.g., a CPU, an MPU, a DMA or a custom LSI), a memory 2102 (volatile or non-volatile RAM or ROM), a cache memory 2103 (volatile or non-volatile RAM), and a drive communication interface 2106 (e.g., SAS (Serial Attached SCSI), SATA (Serial ATA), PATA (Parallel ATA), FC, or SCSI) for the communication with the storage drive.

The drive controlling device 2100 reads or writes data from or to the storage drive 2200 according to the data input/output requests (hereinafter referred to as drive access requests) transmitted from the header device 2500. The drive controlling device 2100 includes various functions for safely or efficiently utilizing the storage drive 2200 such as the function of controlling the storage drive 2200 by RAID (Redundant Arrays of Inexpensive (or Independent) Disks), the function of providing logical storage devices (LDEVs (Logical DEVices) to the header device 2500 and the client device), the function of verifying the soundness of the data, the function of obtaining snapshots, and others. The details of the functions included in the drive controlling device 2100 are described later.

The storage drive 2200 is, for example, a hard disk drive conforming to the specified standards (SAS, SATA, FC, PATA, or SCSI), a JBOD (Just a Bunch Of Disks) configured of multiple hard disk drives, or a semiconductor storage device (SSD (Solid State Drive)).

Figure 2:
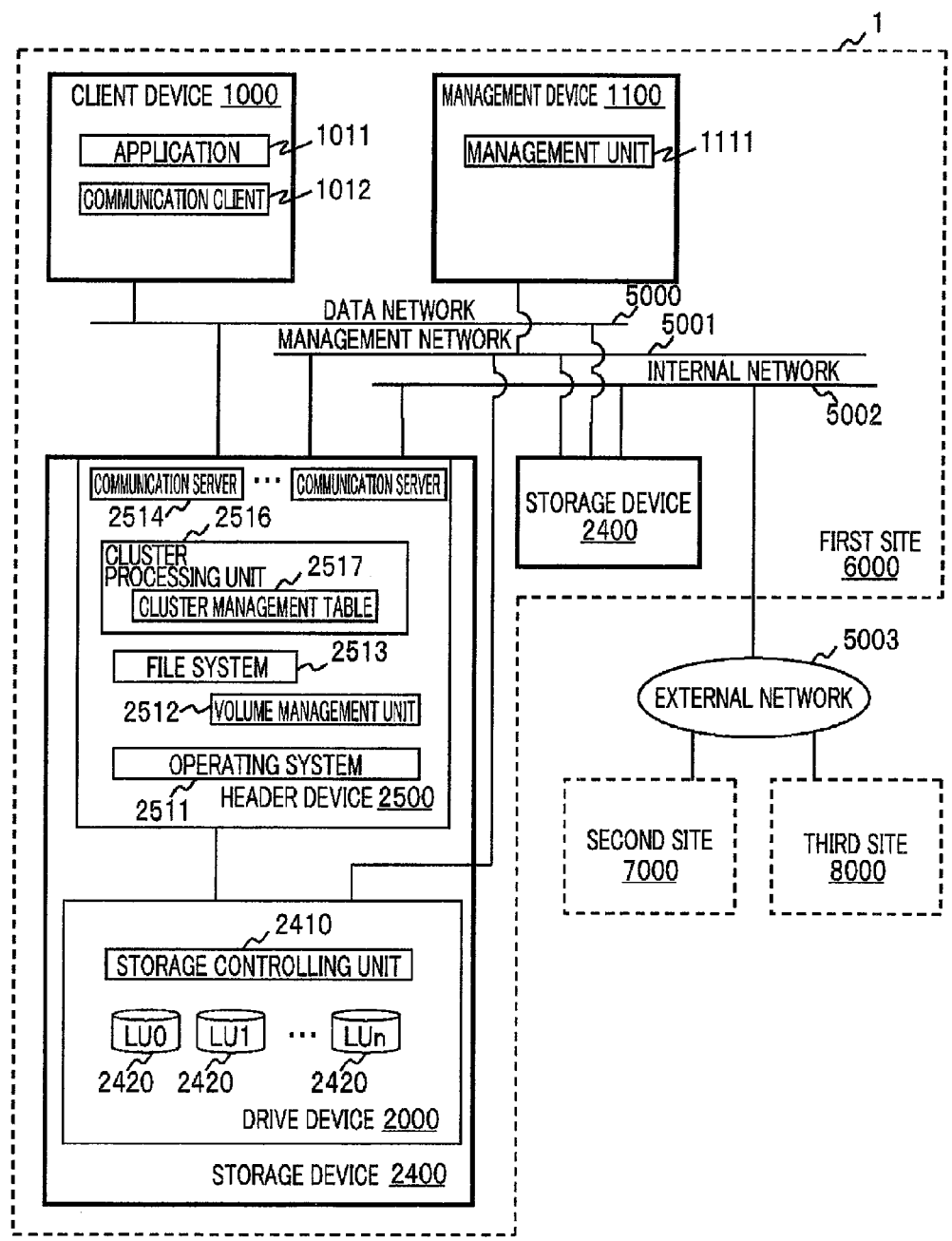
FIG. 2 is a diagram showing the functions of the client device 1000, the management device 1100, and the storage devices 2400.

FIG. 2 shows the functions of the client device 1000, the management device 1100, and the storage devices 2400. In the client device 1000, application software (hereinafter referred to as an application 1011) and a communication client 1012 are executed. The application 1011 is the software for providing, for example, file sharing, Email, database or others.

The communication client 1012 (protocol client) communicates with the storage device 2400 (e.g., transmitting data input/output requests and receiving the responses for the same). For the above-mentioned communication, the communication client 1012 performs the processing (e.g., format conversion and communication control) related to the protocols (e.g., iSCSI, NFS/CIFS, and FC). Note that these functions are achieved by the processor 1001 of the client device 1000 reading the programs stored in the memory 1002.

The management device 1100 includes a management unit 1111. The management unit 1111 sets, controls, and monitors the operations of the storage devices 2400. Note that the management unit 1111 is achieved by the processor 1101 of the management device 1100 through reading and executing the programs stored in the memory 1102. The functions of the management unit 1111 may be achieved either by a different device from the storage devices 2400 or by the storage devices 2400.

The header device 2500 of the storage devices 2400 includes an operating system 2511 (including driver software), a volume management unit 2512, a file system 2513, one or more communication servers 2514 (protocol servers) (protocol processing units), and a cluster processing unit 2516. Note that these functions are achieved by the hardware of the header device 2500 or by the processor 2501 reading the programs stored in the memory 2502.

The volume management unit 2512 provides a virtual storage area (hereinafter referred to as a virtual volume) based on a logical storage area provided by the storage drive 2200 to the client device 1000.

The file system 2513 accepts data input/output requests from the client device 1000 by a file specification method. The header device 2500 operates as the NAS (Network Attached Storage) server in the data network 5000. Note that, though the description of this embodiment assumes the header device 2500 to include the file system 2513, the header device 2500 does not necessarily include the file system 2513. The header device 2500, for example, may accept data input/output requests by an LBA (Logical Block Address) specification method.

The communication server 2514 communicates with the communication client 1012 of the client device 1000 and the management unit 1111 of the management device 1100. For the above-mentioned communication, the communication server 2514 performs the processing related to the protocols (e.g., iSCSI, NFS/CIFS, and FC) (e.g., format conversion and communication control).

The cluster processing unit 2516 processes the data input/output requests following the previously set cluster definition. For example, if the data input/output request received from the client device 1000 addresses itself, the cluster processing unit 2516 processes the data input/output requests by itself. If the received data input/output request addresses another storage device 2400, it transmits the relevant data input/output request to the other storage device 2400 handling the processing of the data input/output request. The cluster processing unit 2516 manages the above-mentioned cluster definitions in a cluster management table 2517.

The drive device 2000 of the storage devices 2400 includes a storage controlling unit 2410. The storage controlling unit 2410 provides the logical volume (hereinafter referred to as an LU 2420 (LU: Logical Unit)) as a logical storage area based on the storage drive 2200 to the header device 2500. The header device 2500 can specify an LU 2420 by specifying an identifier of the LU 2420 (LUN (Logical Unit Number)). The function of the storage controlling unit 2410 is achieved, for example, by an LVM (Logical Volume Manager).

Unified Storage

Figure 3:
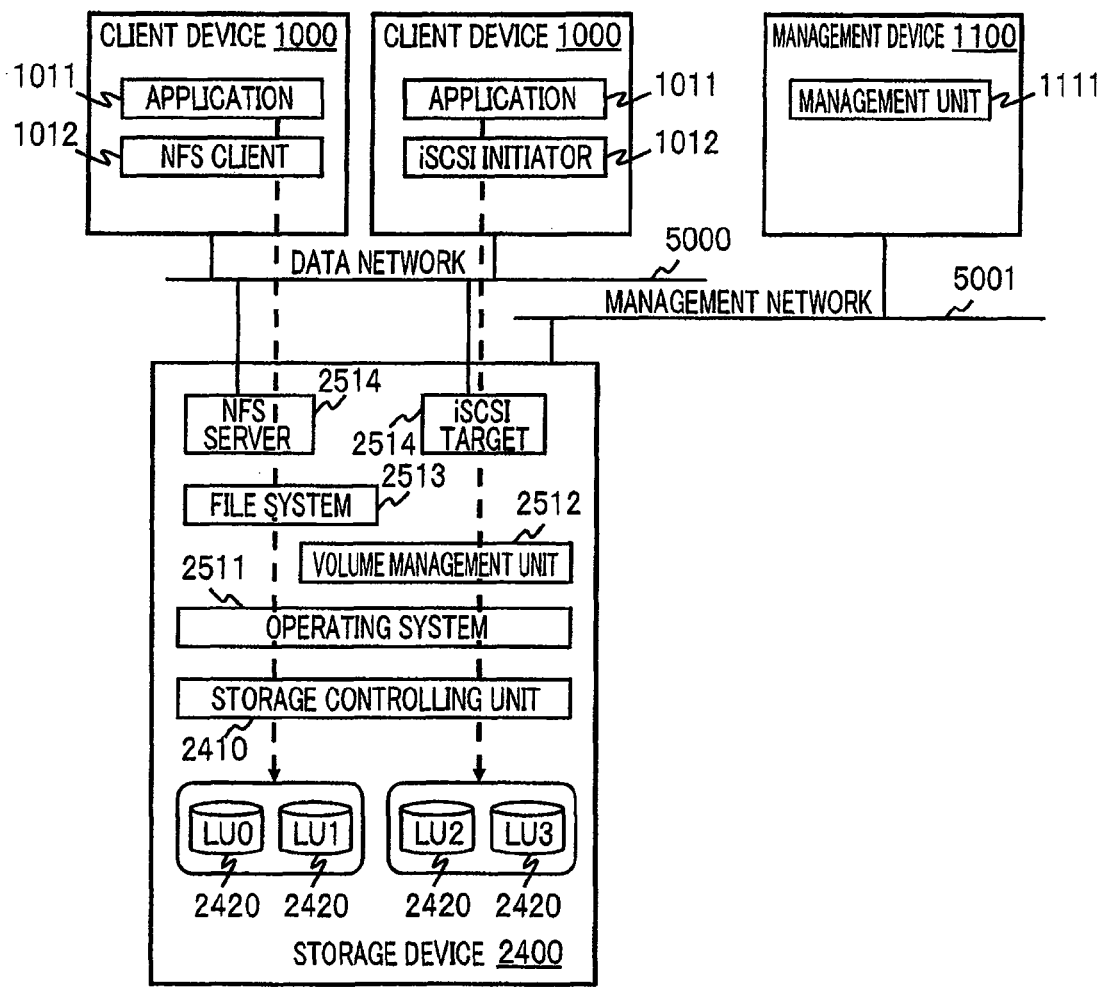
FIG. 3 is a diagram showing the operations of the storage devices 2400.

FIG. 3 is a diagram showing the operations of the storage devices 2400. As mentioned above, the storage devices 2400 are Unified Storages corresponding to multiple protocols (iSCSI, NFS/CIFS, FC) (i.e., capable of responding to the data input/output requests following multiple protocols). The storage device 2400 shown in the figure corresponds to the both protocols of NFS and iSCSI and includes a communication server 2514 operating as an NFS server and a communication server 2514 operating as an iSCSI target. Among these, the above-mentioned communication server 2514 operating as an NFS server accepts data input/output requests transmitted from the communication client 1012 operating as an NFS client of a client device 1000. Meanwhile, the above-mentioned communication server 2514 operating as an iSCSI target accepts data input/output requests transmitted from the communication client 1012 operating as an iSCSI initiator of a client device 1000.

Resource Allocation

Figure 4:
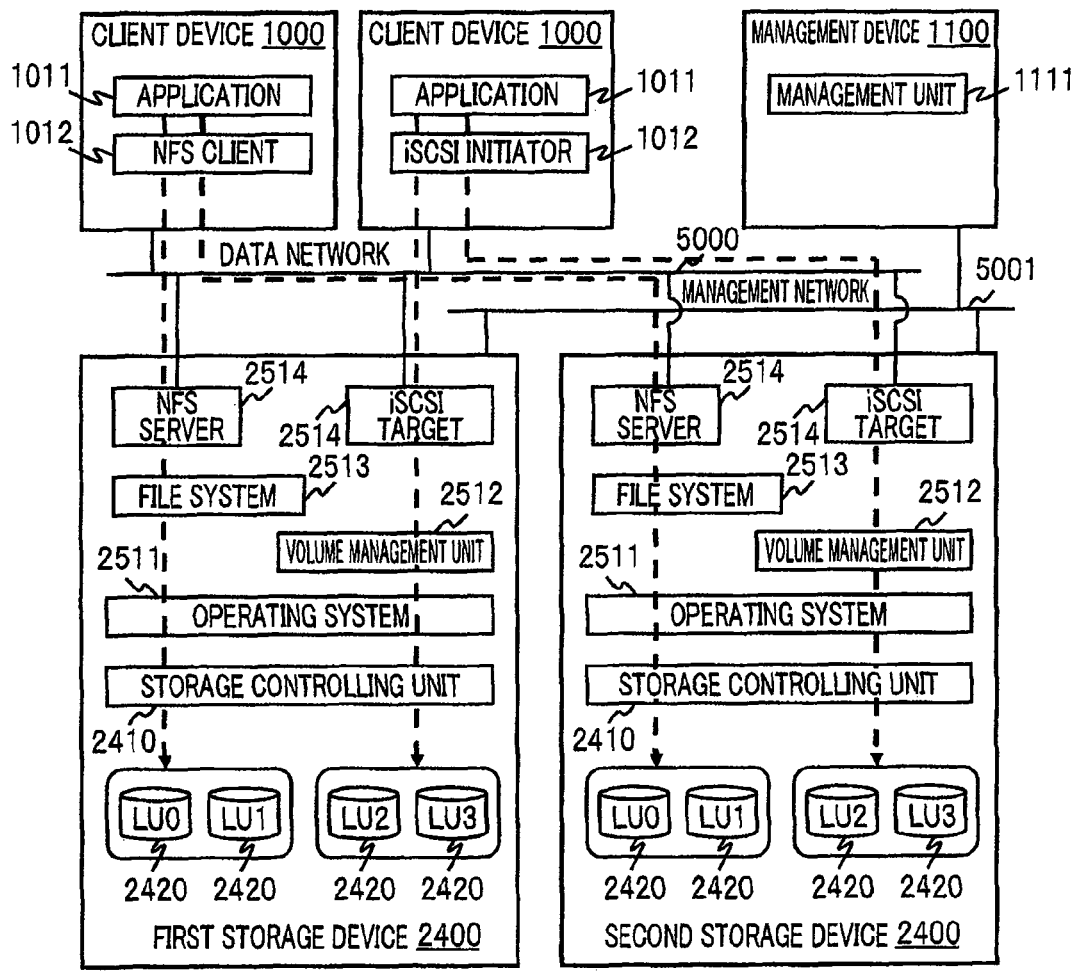
FIG. 4 is a diagram showing the method of accessing the LUs 2420 when newly installing a Unified Storage.

FIG. 4 is a diagram showing the method of accessing the LUs 2420 when newly installing the second storage device 2400 as a Unified Storage in the storage system 1 configured by using the first storage device 2400 as a Unified Storage for the purpose of enhancement of resources (performance, capacity and others) and the like. The user or the operator adds the second storage device 2400 by performing the setting of the LUs 2420 to mount on each client device 1000, the setting of the access path from the client device 1000 to the LUs 2420, and other settings, by using the user interface provided by the management unit 1111 of the management device 1100. Note that, by this method, the storage devices 2400 (the first storage device 2400 and the second storage device 2400) are recognized as two independent devices by the client device 1000.

Cluster

Figures 5, 6:
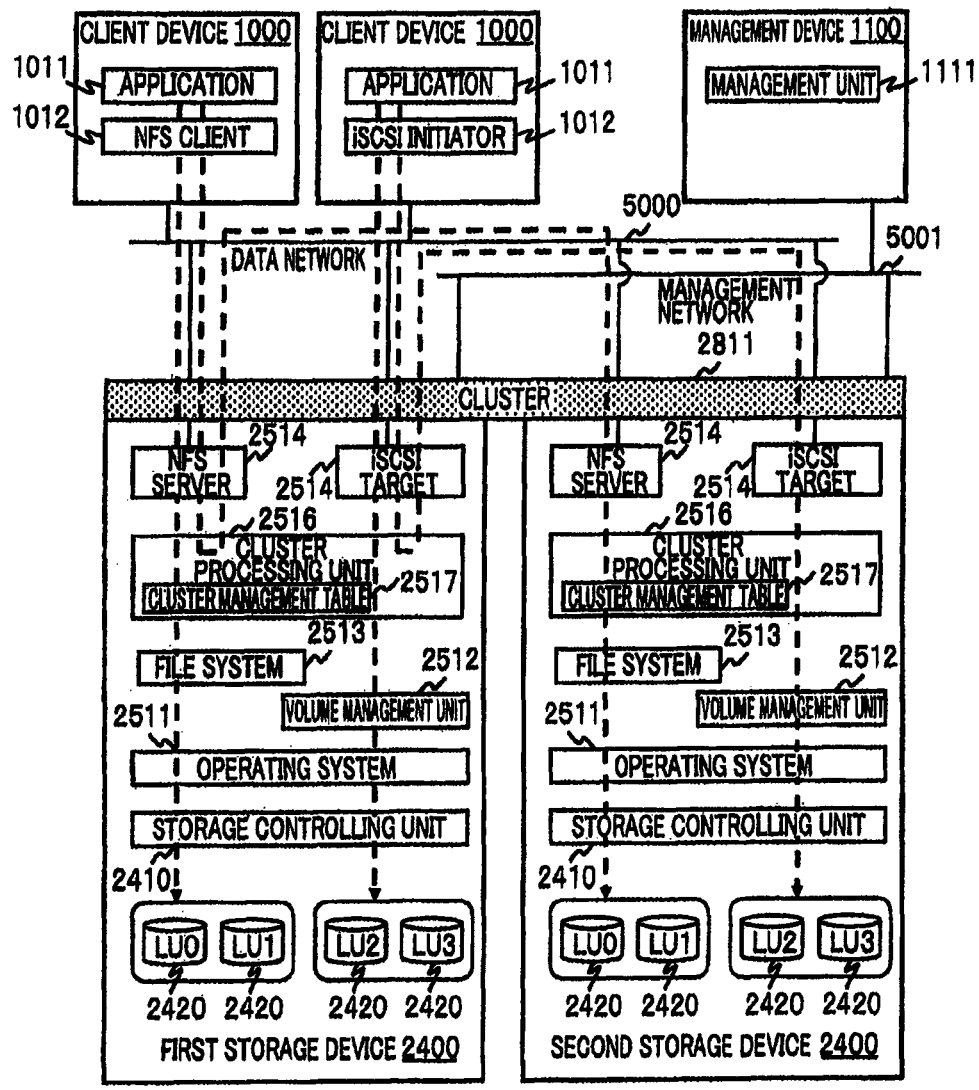
FIG. 5 is a diagram showing the case of achieving a cluster by forwarding.
FIG. 6 is a diagram showing an example of the cluster management table 2517.

FIG. 5, similarly to FIG. 4, shows the case of newly installing the second storage device 2400. However, it is different from FIG. 4 in that a cluster 2811 is configured by using two storage devices 2400, the first storage device 2400 and the second storage device 2400. If the cluster 2811 is configured by this method, the first storage device 2400 and the second storage device 2400 are recognized as one virtual storage system by a client device 1000. Such a cluster 2811 can achieve the data input/output requests transmitted from the client device 1000, for example, by forwarding or redirecting the requests in the storage devices 2400.

Figure 7:
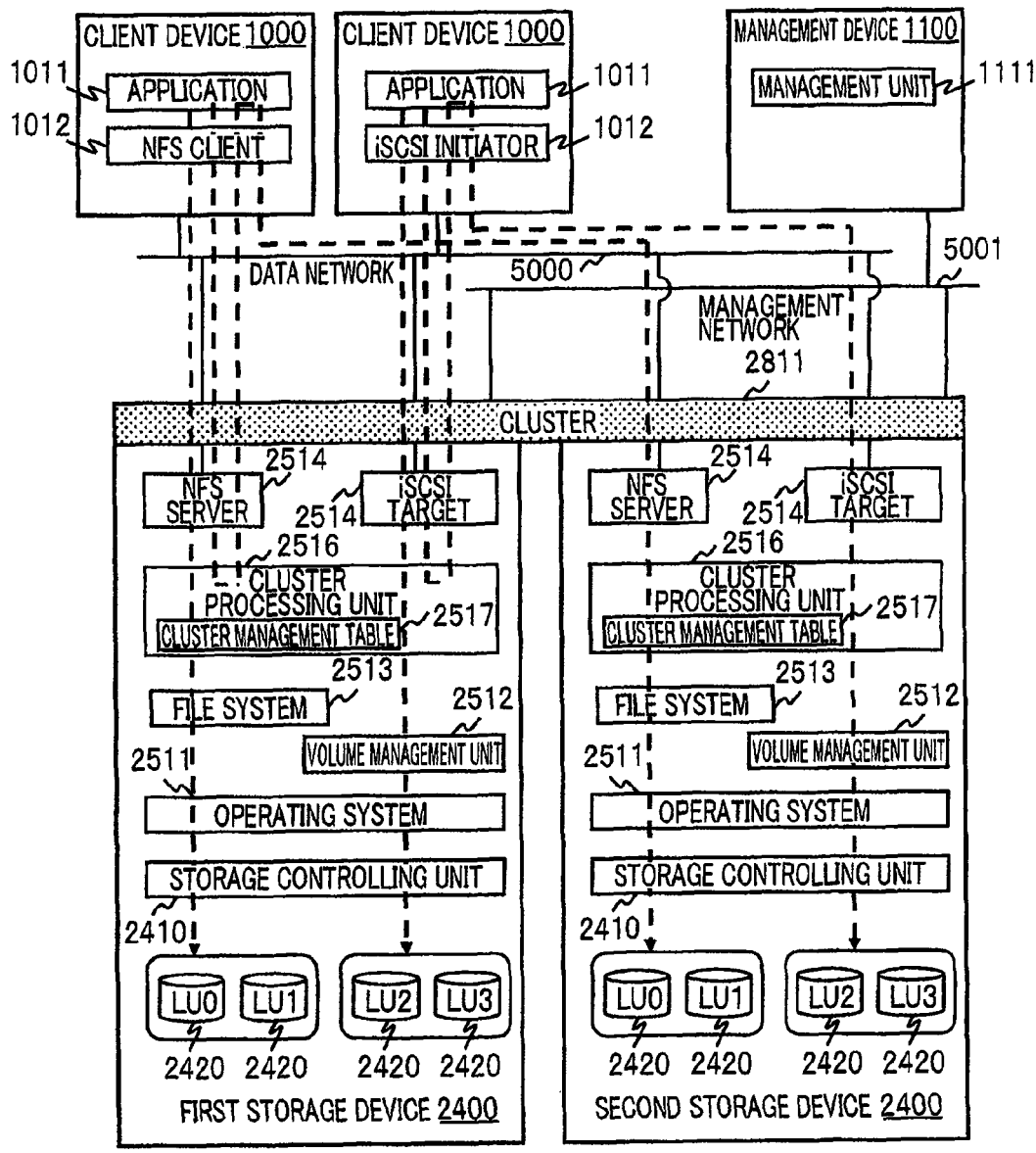
FIG. 7 is a diagram showing the case of achieving a cluster by redirection.

FIG. 5 is a diagram showing the case of achieving a cluster 2811 by forwarding, and FIG. 7 is a diagram showing the case of achieving a cluster 2811 by redirection.

As shown in FIG. 5, in the case of forwarding, the cluster processing unit 2516 firstly identifies the storage device 2400 which should process the data input/output request received from the client device 1000. Then, the cluster processing unit 2516 processes the request if the request is the data input/output request which should be processed by itself, and if the request is the data input/output request which should be processed by the other storage device 2400, transfers the received data input/output request to the other storage device 2400.

FIG. 6 is information referred to by the cluster processing unit 2516 (hereinafter referred to as the cluster management table 2517) when identifying the storage device 2400 which should process the data input/output request. As shown in the figure, the cluster management table 2517 includes one or more records consisting of a cluster name 611 and a node 612. In the cluster name 611, an identifier given to each of the configured cluster groups (hereinafter referred to as a cluster ID) is set. In the node 612, an identifier of the storage device 2400 as a component of each cluster (hereinafter referred to as a device ID) is set.

As shown in FIG. 7, in the case of redirection, the cluster processing unit 2516 firstly identifies the storage device 2400 which should process the data input/output request received from the client device 1000 by referring to the cluster management table 2517. Then, the cluster processing unit 2516 processes the request if the request is the data input/output request which should be processed by itself and, if the request is the data input/output request which should be processed by the other storage device 2400, notifies the redirecting address (the other storage device 2400 identified (e.g., network address)) to the client device 1000 which transmitted the received data input/output request. The client device 1000 which has received the notification retransmits the data input/output request to the notified redirecting address.

Cluster Group in Units of Protocols

Though the methods of achieving cluster groups 2811 without depending on the protocols have been described above, a group of clusters (hereinafter referred to as a cluster group 2812) can be set in units of protocols by using the characteristics of the Unified Storages (capable of corresponding to multiple protocols).

FIG. 8 is a diagram showing the case of setting cluster groups 2812 in units of protocols (each with the NFS server and the iSCSI target shown in the figure). Cluster groups 2812 can also be achieved by preparing the above-mentioned cluster management table 2517 and performing forwarding or redirection.

FIG. 9 is an example of the cluster management table 2517 used for managing the cluster group 2812. As shown in the figure, the cluster management table 2517 includes one or more records consisting of a cluster name 911, a node 912, a role 913, and a node 914. In the cluster name 911, an identifier given to each of the configured clusters (hereinafter referred to as a cluster ID) is set. In the node 912, an identifier of the storage device 2400 as a component of each cluster (hereinafter referred to as a device ID) is set. In the role 913, an identifier for identifying the protocol supported by each cluster group 2812 (hereinafter referred to as a protocol ID) is set. In the node 914, an identifier of the storage device 2400 allocated to each role is set.

In the cluster management table 2517 shown in FIG. 9, a group of storage devices 2400 with the cluster name 911 of "Cluster 1" and the node 914 of "10.1.1.1-10.1.1.5" configure the cluster group 2812 with the NFS server of the role 913 of "NAS-1". A group of storage devices 2400 with the cluster name 911 of "Cluster 1" and the node 914 of "10.1.1.6-10.1.1.10" configure the cluster group 2812 with the iSCSI server of the role 913 of "iSCSI-1". A group of storage devices 2400 with the cluster name 911 of "Cluster 2" and the node 914 of "10.1.1.11-10.1.1.15" configure the cluster group 2812 with the FC (Fibre Channel) server of the role 913 of "FC-1". A group of storage devices 2400 with the cluster name 911 of "Cluster 2" and the node 914 of "10.1.1.16-10.1.1.20" configure the cluster group 2812 with the NFS server of the role 913 of "NAS-2".

Note that, for setting a cluster group 2812 in units of protocols, it can be considered to inactivate resources (hardware resources and software resources) for achieving the protocols unused by each storage device 2400. FIG. 8 shows the active resources in full lines and inactive resources in dashed lines. As shown in the figure, by inactivating the resources of the unused protocols, the processing load on the storage device 2400 can be reduced, and the storage device 2400 can be efficiently operated.

Initial Setting

FIG. 10 is a flowchart showing the processing performed when the user or the operator performs initial setting of a cluster 2811 and a cluster group 2812 by operating the management device 1100 (hereinafter referred to as the cluster setting processing S1000). Note that the letter "S" added to the head of the numerals in the description below indicates a step.

Firstly, the management unit 1111 of the management device 1100 accepts setting information of the cluster 2811 and setting information of the cluster group 2812 from the user or the operator (S1011 to S1012). At this time, the management unit 1111 accepts the setting information, for example, by displaying the setting screen of the cluster management table 2517 shown in FIG. 9.

Next, the management unit 1111 transmits the accepted setting information to the storage device 2400 via the management network 5001 (S1013). The cluster processing unit 2516 of each storage device 2400 receives the setting information transmitted from the management device 1100 (S1021), and reflects the received setting information in the cluster management table 2517 (S1022). After reflecting the setting information in the cluster management table 2517, the cluster processing unit 2516 of each storage device 2400 transmits a registration completion report to the management device 1100 (S1023).

Upon reception of the registration completion report (S1031), the management unit 1111 transmits a resource setting command the (command for setting activation or inactivation) (S1032) to the cluster processing unit 2516 of each storage device 2400. Upon reception of the resource setting command (S1041), the cluster processing unit 2516 of each storage device 2400 activates the resources related to the protocols which it handles, and inactivates the resources related to the protocols which it does not handle (S1042). This series of processing (S1031, 1032, 1041, and 1042) is not mandatory, but it may also be treated as an option. This may also be applied to the following descriptions.

Note that the activation of software resources means starting the process of the software, while the inactivation of software resources means terminating or deleting the process of the software.

The cluster processing unit 2516, according to the interface protocol allocated to the node, performs the operations of starting, terminating and deleting for the interface processing process (nfsd or iSCSI target software).

The Case of Changing Cluster Group Setting

Next, the case of changing the setting of cluster groups 2812 when clusters 2811 and cluster groups 2812 are already set in the storage system 1, as shown in FIG. 11, is described below. FIG. 12 is a flowchart showing the processing of changing the setting of cluster groups 2812 when clusters 2811 and cluster groups 2812 are already set in the storage system 1 (hereinafter referred to as the setting changing processing S1200).

Firstly, the management unit 1111 of the management device 1100 accepts setting information of the cluster groups 2812 from the user or the operator (S1211). The management unit 1111 accepts the setting information, for example, by displaying the setting screen of the cluster management table 2517 shown in FIG. 9.

Next, the management unit 1111 transmits the accepted setting information to each of the storage devices 2400 via the management network 5001 (S1212). The cluster processing unit 2516 of each storage device 2400 receives the setting information transmitted from the management device 1100 (S1221), and reflects the received setting information in the cluster management table 2517 (S1222). After reflecting the setting information in the cluster management table 2517, the cluster processing unit 2516 of each storage device 2400 transmits a registration completion report to the management device 1100 (S1223).

Upon reception of the registration completion report (S1231), the management unit 1111 of the management device 1100 identifies the LU 2420 which does not match the newly set setting of the cluster groups 2812 (after the change of the setting) (i.e., the LU not matching the usage of the cluster group 2812 after the change of the setting) (S1232). At this step, such an LU 2420 is identified by referring to the information related to the LUs 2420 managed by each of the storage devices 2400. FIG. 13 is a table shown as an example of such information (hereinafter referred to as the volume management table 1300). In the volume management table 1300 shown in the figure, the current usage 1312 (protocol) of each LU 2420 (LUN 1311) is managed.

Next, the management unit 1111 determines the storage device 2400 as the migration destination of the LU 2420 identified at S1232 (hereinafter referred to as the migration destination storage device 2400) (S1233). This determination by the management unit 1111 is made, after the above-mentioned change of the setting, by selecting one of the storage devices 2400 supporting the protocols matching the usage of the LU 2420 identified at S1232 from the cluster management table 2517. Note that, if multiple migration destination storage devices 2400 can be selected at this step, the management unit 1111 selects the most appropriate one in view of, for example, the round-robin method, load distribution, the remaining capacity of the storage area and other factors.

Next, the management unit 1111 starts the processing of migrating the data of the identified LU 2420 to the determined destination (hereinafter referred to as the migration processing S1234) (S1234). FIG. 14 is a flowchart showing the details of the migration processing S1234.

Firstly, the management unit 1111 of the management device 1100 selects one of the identified LUs 2420 (hereinafter referred to as the migration source LU 2420) (S1411). Next, the management unit 1111 transmits a command for obtaining a snapshot of the migration source LU 2420 to the storage device 2400 in which the selected migration source LU 2420 exists (hereinafter referred to as a migration source storage device 2400) (S1412). Upon reception of the command for obtaining the snapshot (S1413), the migration source storage device 2400 obtains the snapshot of the migration source LU 2420 (S1414).

Next, the management unit 1111 transmits a command for creating the LU as the migration destination of the migration source LU 2420 (hereinafter referred to as a migration destination LU 2420) to the migration destination storage device 2400 determined at S1233 (S1421). Upon reception of the above-mentioned creation command (S1422), the migration destination storage device 2400 creates the migration destination LU 2420 (S1423).

Next, the management unit 1111 transmits a command for replicating the data stored in the migration source LU 2420 to the migration destination LU 2420 to the migration source storage device 2400 and the migration destination storage device 2400 (S1431). Upon reception of the above-mentioned replication command (S1432 and S1433), the migration source storage device 2400 and the migration destination storage device 2400 transfers the snapshot obtained at S1414 from the migration source LU 2420 to the migration destination LU 2420 (S1434 and S1435). After the replication is completed, a snapshot replication completion report is transmitted from the migration destination storage device 2400 (or migration source storage device 2400 may also be possible) to the management device 1100 (S1436). The management device 1100 receives the transmitted replication completion report (S1437). After receiving the replication completion report, the management device 1100 issues a command for terminating the migration source LU (S1441-S1443). Further, the management device 1100 issues a command for starting the migration destination LU (S1451-S1453).

Note that, if the migration source storage device 2400 is implemented with a function of performing the above-mentioned replication without suspending the services for the client device 1000 (hereinafter referred to as the fault-tolerant migration function), differential data while the above-mentioned replication is in process is managed by the cache memory 2503 (which can be replaced by cache memory 2103) and the storage drive 2200, and after the replication is completed, the managed differential data is reflected in the migration destination LU 2420.

Next, the management unit 1111 performs the processing for transiting the port connected with the migration source LU 2420 to the port connected with the migration destination LU 2420 (S1461). This processing is performed by, for example, setting the IP address of the iSCSI port connected with the migration source LU 2420 to the IP address of the iSCSI port connected with the migration destination LU 2420. Note that it is preferable to perform this transition without changing the settings of the client device 1000 by, for example, changing the IP address by DNS (Domain Name Server (System)) rather than changing the service name or others before and after the migration.

At S1462, the management unit 1111 determines whether there are any LUs 2420 not selected at S1411. If there are any (S1462:YES), the processing returns to S1411. If not (S1462: NO), the migration processing S1234 is completed and returns to S1235 in FIG. 12.

Note that the above-mentioned description of the migration processing S1234 assumes the use of the data replication function among the storage devices 2400 implemented in the storage devices 2400, but it is also possible to perform the data replication from the migration source LU 2420 to the migration destination LU 2420 by using the replication function implemented in the network switch configuring the data network 5000, the replication function installed in the client device 1000 or others.

The description returns to FIG. 12 again. At S1235, the management unit 1111 transmits a resource setting command to the cluster processing unit 2516 of each storage device 2400 (S1235). Upon reception of the transmitted resource setting command (S1241), the cluster processing unit 2516 of each storage device 2400 performs the resource setting (activation or inactivation) according to the setting of its cluster group 2812 after the change (S1242).

As mentioned above, if the contents of the cluster management table 2517 are changed, the cluster processing unit 2516 automatically migrates the data to the LU 2420 of the other storage device 2400 matching the protocol corresponding to the LU 2420. Therefore, the configuration of the cluster groups 2812 can be changed easily and flexibly by, for example, changing the cluster management table 2517 from the management device 1100.

The Case of Adding New Node to Existing Cluster Group

Next, as shown in FIG. 15, the case of adding a new node (storage device 2400) to an existing cluster group 2812 is described below. FIG. 16 is a flowchart showing the processing performed in this case (node addition processing S1600). The node addition processing S1600 is described below by referring to the above-mentioned figure.

Firstly, the management unit 1111 of the management device 1100 accepts setting information of adding a new node (the fifth storage device 2400 in the above-mentioned figure) to a cluster group 2812 from the user or the operator (S1611). At this time, the management unit 1111 accepts the setting information, for example, by displaying the setting screen of the cluster management table 2517 shown in FIG. 9.

Next, the management unit 1111 transmits the above-mentioned accepted setting information to each storage device 2400 via the management network 5001 (S1612). The cluster processing unit 2516 of each storage device 2400 receives the setting information transmitted from the management device 1100 (S1621), and reflects the received setting information in the cluster management table 2517 (S1622). After reflecting the setting information in the cluster management table 2517, the cluster processing unit 2516 of each storage device 2400 transmits a registration completion report to the management device 1100 (S1623).

Upon reception of the registration completion report (S1631), the management unit 1111 determines whether it is necessary to migrate the data (relocate the data) or not due to the addition of the node (S1632). This determination is made with reference to the load information of the LUs 2420 such as the usage status of each LU 2420 in each storage device 2400 or the port performance information connected with each LU 2420. If data migration is determined to be necessary (S1632:YES), the management unit 1111 starts a data migration processing (S1633). This migration processing S1633 is the same as the above-mentioned migration processing S1234 shown in FIG. 14.

Next, the management unit 1111 transmits a resource setting command to the cluster processing unit 2516 of each storage device 2400 (S1635). Upon reception of the transmitted resource setting command (S1641), the cluster processing unit 2516 of each storage device 2400 performs the resource setting (activation or inactivation) according to the setting of its cluster group 2812 after the change (S1642).

As mentioned above, if the contents of the cluster management table 2517 are changed to add a new storage device 2400 to an existing cluster group 2812, the cluster processing unit 2516 determines whether it is necessary to relocate the data or not according to the load information of the LUs 2420, and if it is determined to be necessary, automatically migrates the data between the LUs 2420. As mentioned above, this method enables easy addition of a new storage device 2400 to the already configured cluster group 2812. It is also possible to optimize the performance of the storage system 1 by attempting load distribution at the time of relocation.

The Case of Deleting Node from Cluster Group

Next, as shown in FIG. 17, the case of deleting a node from an existing cluster group 2812 is described below. FIG. 18 is a flowchart showing the processing performed in this case (node deletion processing S1800). The node deletion processing S1800 is described below by referring to FIG. 18.

Firstly, the management unit 1111 of the management device 1100 accepts setting information of deleting a node (the first storage device 2400 in FIG. 17) from a cluster group 2812 from the user or the operator (S1811). At this time, the management unit 1111 accepts the setting information, for example, by displaying the setting screen of the cluster management table 2517 shown in FIG. 9.

Next, the management unit 1111 transmits the accepted setting information to each storage device 2400 via the management network 5001 (S1812). The cluster processing unit 2516 of each storage device 2400 receives the setting information transmitted from the management device 1100 (S1821), and reflects the received setting information in the cluster management table 2517 (S1822). After reflecting the setting information in the cluster management table 2517, the cluster processing unit 2516 of each storage device 2400 transmits a registration completion report to the management device 1100 (S1823).

Upon reception of the registration completion report (S1831), the management unit 1111 determines the storage device 2400 as the migration destination (hereinafter referred to as the migration destination storage device 2400) of the data stored in the LU 2420 (LU 2420 to be deleted) of the storage device 2400 to be deleted (S1832). This determination by the management unit 1111 is made, after the above-mentioned change of the setting, by selecting one of the storage devices 2400 supporting the protocols matching the usage of the LU 2420 to be deleted from the cluster management table 2517. Note that, if multiple migration destination storage devices 2400 can be selected at this step, the management unit 1111 selects the most appropriate one in view of, for example, the round-robin method, load distribution, the remaining capacity of the storage area and other factors.

Next, the management unit 1111 starts to migrate the data stored in the LU 2420 of the first storage device 2400 to be deleted to the LU 2420 of another storage device 2400 determined at S1832 (S1833). This migration processing is the same as the above-mentioned migration processing S1234 shown in FIG. 14.

As mentioned above, if the contents of the cluster management table 2517 are changed to delete a storage device 2400 from an already configured cluster group 2812 when the cluster groups 2812 for each of the protocols have already been configured, the cluster processing unit 2516 migrates the data to the LU 2420 of another storage device 2400 handling the protocol which used to be handled by the relevant storage device 2400. This enables easy deletion of the storage device 2400 from the already configured cluster group 2812.

The Case of Transferring Node between Cluster Groups

Next, as shown in FIG. 19, the case of transferring a node (storage device 2400) belonging to an existing cluster group 2812 to another existing cluster group 2812 is described below. FIG. 20 is a flowchart showing the processing performed in this case (node transfer processing S2000). The node transfer processing S2000 is described below by referring to FIG. 20.

Firstly, the management unit 1111 of the management device 1100 accepts setting information of transferring a node (FIG. 19 shows the case of transferring the second storage device 2400 belonging to the cluster group 2812 of the NAS clusters to the cluster group 2812 (iSCSI clusters)) from the user or the operator (S2011). At this time, the management unit 1111 accepts the setting information, for example, by displaying the setting screen of the cluster management table 2517 shown in FIG. 9.

Next, the management unit 1111 transmits the accepted setting information to each storage device 2400 via the management network 5001 (S2012). The cluster processing unit 2516 of each storage device 2400 receives the setting information transmitted from the management device 1100 (S2021), and reflects the received setting information in the cluster management table 2517 (S2022). After reflecting the setting information in the cluster management table 2517, the cluster processing unit 2516 of each storage device 2400 transmits a registration completion report to the management device 1100 (S2023).

Upon reception of the registration completion report (S2031), the management unit 1111 determines whether it is necessary to migrate (relocate) the data or not (S2032). This determination is made with reference to the load information of the LUs 2420 such as the usage status of each LU 2420 in each storage device 2400 or the port performance information connected with each LU 2420. If data migration is determined to be necessary (S2032: YES), the management unit 1111 starts a data migration processing (S2033). This processing is the same as the migration processing S1234 shown in FIG. 14.

Next, the management unit 1111 transmits a resource setting command to the cluster processing unit 2516 of each storage device 2400 (S2035). Upon reception of the resource setting command (S2041), the cluster processing unit 2516 of each storage device 2400 performs the resource setting (activation or inactivation) according to the setting of its cluster group 2812 after the change (S2042).

As mentioned above, if the contents of the cluster management table 2517 are changed to transfer the storage device 2400 configuring a certain cluster group 2812 to another cluster group 2812 when the cluster groups 2812 for each of the protocols have already been configured, the cluster processing unit 2516 determines whether it is necessary to relocate the data or not according to the load information of the LUs 2420, and if it is determined to be necessary, automatically migrates the data between the LUs 2420. Thus, this invention enables easy migration of a storage device 2400 configuring a certain cluster group 2812 to another cluster group by changing the contents of the cluster management table 2517. It is also possible to optimize the performance of the storage system by attempting load distribution at the time of relocation.

As described so far, the storage system 1 in this embodiment enables the easy configuration of cluster groups 2812 for each protocol by using a storage device 2400 (Unified Storage) including the communication server 2514 (protocol processing unit) capable of responding to data input/output requests following at least two or more protocols transmitted from the client device 1000. By this method, it is possible to optimize the performance separation according to the usage status of the protocol and the storage system performance.

It is to be understood that the above-described embodiments are intended for ease of understanding this invention and by no means should be limited to the particular constructions herein, but also comprises any changes, modifications or equivalents within the spirit and scope hereof.

The invention claimed is:

1. A storage system comprising:
a plurality of storage devices, each of the storage devices including:
a storage controlling unit writing data to a storage drive and reading data from the storage drive according to data input/output requests transmitted from an external device; and
a protocol processing unit responding to the data input/output requests transmitted from the external device according to two or more protocols according to results of the data input/output requests processed by the storage controlling unit which follow the two or more protocols; and
a cluster processing unit configuring a cluster which includes one or more storage devices of the plurality of storage devices, and further configuring a cluster group, which is a group of clusters, for each of the two or more protocols.

2. The storage system according to claim 1, wherein
the storage device stores a cluster management table in which the two or more protocols handled by the cluster groups to which each of the storage devices belongs are managed, and
the cluster processing unit configures a cluster group for each of the two or more protocols by forwarding or redirecting the data input/output requests transmitted from the external device to the other storage devices according to the cluster management table.

3. The storage system according to claim 1, wherein
if cluster groups for each of the two or more protocols are configured, the cluster processing unit inactivates resources for achieving the two or more protocols other than one of the two or more protocols handled by the cluster group to which the one or more storage devices of the plurality of the storage device belongs from among the resources for processing the two or more protocols in the storage device.

4. The storage system according to claim 1, wherein
the storage device stores a cluster management table in which the two or more protocols handled by the cluster groups to which each of the storage devices belongs are managed,
the storage device provides the storage drive in units of logical volumes which are logically set storage areas to the external device, and
wherein if the contents of the cluster management table are changed when the cluster groups for each of the two or more protocols has already been configured and if the protocol to which the logical volumes correspond do not match the protocol to which the storage devices, of which the relevant logical volumes belong, are supposed to handle after the change, the cluster processing unit migrates the data of the relevant logical volumes to other logical volumes of another one of the storage devices which is supposed to handle the protocol after the change with which the relevant logical volumes correspond.

5. The storage system according to claim 1, wherein
the storage device stores the cluster management table in which the two or more protocols handled by the cluster groups to which each of the storage devices belongs are managed,
the storage device provides the storage drive in units of logical volumes which are logically set storage area to the external device, and
if the contents of the cluster management table are changed by adding another one of the storage devices to a previously configured cluster group when the cluster groups for each of the two or more protocols have already been configured, the cluster processing unit determines whether it is necessary to relocate the data or not according to load information of the logical volumes, and if it is determined to be necessary, migrates the data between the logical volumes.

6. The storage system according to claim 1, wherein
the storage device stores the cluster management table in which the two or more protocols handled by the cluster groups to which each of the storage devices belongs are managed,
the storage device provides the storage drive in units of logical volumes which are logically set storage areas to the external device, and
if the contents of the cluster management table are changed by deleting one of the storage devices from previously configured cluster group when the cluster groups for each of the two or more protocols have already been configured, the cluster processing unit migrates the data of the logical volumes of the one of the storage devices to be deleted to the logical volumes of another one of the storage devices handling the protocol which the one of the storage devices to be deleted used to handle.

7. The storage system according to claim 1, wherein
the storage device stores the cluster management table in which the two or more protocols handled by the cluster groups to which each of the storage devices belongs are managed,
the storage device provides the storage drive in units of logical volumes which are logically set storage areas to the external device, and
if the contents of the cluster management table are changed by migrating one of the storage devices configuring a certain cluster group to another cluster group when the cluster groups for each of the two or more protocols have already been configured, the cluster processing unit determines whether it is necessary to relocate the data or not according to the load information of the logical volumes, and if it is determined to be necessary, migrates the data between the logical volumes.

8. The storage system according to claim 1, wherein
the two or more protocols include at least one of iSCSI (Internet Small Computer System Interface), NFS/CIFS (NFS: Network File System, CIFS: Common Internet File System), and FC (Fibre Channel).

9. A method for controlling a storage system including a plurality of storage devices, each of the storage devices including:
a storage controlling unit writing data to a storage drive and reading data from the storage drive according to data input/output requests transmitted from an external device; and
a protocol processing unit responding to the data input/output requests transmitted from the external device according to two or more protocols according to results of the data input/output requests processed by the storage controlling unit which follow the two or more protocols; and
a cluster processing unit configuring a cluster which includes one or more storage devices of the plurality of storage devices, and further configuring a cluster group, which is a group of clusters, for each of the two or more protocols, the method comprising:
storing a cluster management table in which the two or more protocols handled by the cluster groups to which each of the storage devices belongs are managed; and
configuring, by the cluster processing unit, the cluster group for each of the two or more protocols by forwarding or redirecting the data input/output requests transmitted from the external device to another one or more of the storage devices of the cluster group handling each of the two or more protocols according to the cluster management table.

10. The method for controlling a storage system according to claim 9, wherein
if cluster groups for each of the two or more protocols are configured, the cluster processing unit inactivates resources for achieving the two or more protocols other than the protocol handled by the cluster group to which the one or more of the storage devices belongs from among the resources for processing the two or more protocols in the storage device.

11. The method for controlling a storage system according to claim 9, further comprising:
providing each storage device in units of logical volumes which are logically set storage areas to the external device, and
wherein if the contents of the cluster management table are changed when the cluster groups for each of the two or more protocols has already been configured and if the protocol to which the logical volumes correspond do not match the protocol to which the storage devices, of which the relevant logical volumes belong, are supposed to handle after the change, the cluster processing unit migrates the data of the relevant logical volumes to other logical volumes of another one of the storage devices which is supposed to handle the protocol after the change with which the relevant logical volumes correspond.

12. The method for controlling a storage system according to claim 9, further comprising providing each storage drive in units of logical volumes which are the logically set storage area to the external device, and wherein if the contents of the cluster management table are changed by adding another one of the storage devices to a previously configured cluster group when the cluster groups for each of the two or more protocols have already been configured, the cluster processing unit determines whether it is necessary to relocate the data or not according to load information of the logical volumes, and if it is determined to be necessary, migrates the data between the logical volumes.

13. The method for controlling a storage system according to claim 9, further comprising providing each storage drive in units of logical volumes which are the logically set storage area to the external device, and wherein if the contents of the cluster management table are changed by deleting one of the storage devices from a previously configured cluster group when the cluster groups for each of the two or more protocols have already been configured, the cluster processing unit migrates the data of the logical volumes of the one of the storage devices to be deleted to the logical volumes of another one of the storage devices handling the protocol which the one of the storage devices to be deleted used to handle.

14. The method for controlling a storage system according to claim 9, further comprising providing each storage drive in units of logical volumes which are the logically set storage area to the external device, and wherein if the contents of the cluster management table are changed by migrating one of the storage devices configuring a certain cluster group to another cluster group when the cluster groups for each of the two or more protocols have already been configured, the cluster processing unit determines whether it is necessary to relocate the data or not according to the load information of the logical volumes, and if it is determined to be necessary, migrates the data between the logical volumes.

* * * * *